(12) United States Patent
Tanaka et al.

(10) Patent No.: US 11,167,752 B2
(45) Date of Patent: Nov. 9, 2021

(54) DRIVING ASSISTANT APPARATUS, DRIVING ASSISTANT METHOD, MOVING OBJECT, AND PROGRAM

(71) Applicant: Sony Corporation, Tokyo (JP)

(72) Inventors: Noriko Tanaka, Tokyo (JP); Itaru Shimizu, Tokyo (JP); Kazuyuki Marukawa, Kanagawa (JP); Asako Kaneko, Tokyo (JP)

(73) Assignee: Sony Corporation, Tokyo (JP)

( * ) Notice: Subject to any disclaimer, the term of this patent is extended or adjusted under 35 U.S.C. 154(b) by 256 days.

(21) Appl. No.: 16/325,521

(22) PCT Filed: Aug. 8, 2017

(86) PCT No.: PCT/JP2017/028672
§ 371 (c)(1),
(2) Date: Feb. 14, 2019

(87) PCT Pub. No.: WO2018/037900
PCT Pub. Date: Mar. 1, 2018

(65) Prior Publication Data
US 2019/0193728 A1    Jun. 27, 2019

(30) Foreign Application Priority Data

Aug. 22, 2016 (JP) .............................. JP2016-162056

(51) Int. Cl.
*B60W 30/09* (2012.01)
*B60W 40/04* (2006.01)
(Continued)

(52) U.S. Cl.
CPC ............. *B60W 30/09* (2013.01); *B60R 21/00* (2013.01); *B60W 30/08* (2013.01);
(Continued)

(58) Field of Classification Search
CPC .. B60W 30/09; B60W 2300/10; B60W 30/10; B60W 30/14; B60W 30/08;
(Continued)

(56) References Cited

U.S. PATENT DOCUMENTS 9,630,619 B1 * 4/2017 Kentley ................ G01C 21/32
10,347,127 B2    7/2019 Droz et al.
(Continued)

FOREIGN PATENT DOCUMENTS

DE    10 2007 048 810 A1    4/2009
DE    10 2009 057978 A1     6/2011
(Continued)

OTHER PUBLICATIONS

English Translation_JP2012234408A (Year: 2012).*
(Continued)

*Primary Examiner* — Russell Frejd
*Assistant Examiner* — Ashley L Redhead, Jr.
(74) *Attorney, Agent, or Firm* — Wolf, Greenfield & Sacks, P.C.

(57) ABSTRACT

The present technology relates to a driving assistant apparatus, a driving assistant method, a moving object, and a program that make it possible to perform appropriate driving assistant. The driving assistant apparatus includes a control unit that performs, on the basis of peripheral vehicle information regarding a peripheral vehicle present in an area corresponding to the number of occupants in a host vehicle, driving assistant processing of the host vehicle. The present technology is applicable to a moving object such as an automobile.

12 Claims, 17 Drawing Sheets

(51) Int. Cl.

| | | |
|---|---|---|
| *B60W 30/10* | (2006.01) | |
| *B60W 30/14* | (2006.01) | |
| *G08G 1/16* | (2006.01) | |
| *B60W 30/08* | (2012.01) | |
| *B60W 30/16* | (2020.01) | |
| *G01S 7/40* | (2006.01) | |
| *B60R 21/00* | (2006.01) | |
| *B60W 30/095* | (2012.01) | |
| *G01S 17/931* | (2020.01) | |
| *B60W 40/08* | (2012.01) | |
| *G01S 13/86* | (2006.01) | |
| *G01S 13/931* | (2020.01) | |

(52) U.S. Cl.
CPC .......... *B60W 30/095* (2013.01); *B60W 30/10* (2013.01); *B60W 30/14* (2013.01); *B60W 30/16* (2013.01); *B60W 40/04* (2013.01); *G01S 7/4026* (2013.01); *G01S 17/931* (2020.01); *G08G 1/16* (2013.01); *B60W 2040/0881* (2013.01); *B60W 2300/10* (2013.01); *B60W 2530/10* (2013.01); *B60W 2554/80* (2020.02); *B60W 2556/65* (2020.02); *G01S 7/403* (2021.05); *G01S 7/4034* (2021.05); *G01S 13/867* (2013.01); *G01S 2013/9316* (2020.01); *G01S 2013/9323* (2020.01); *G01S 2013/9324* (2020.01); *G08G 1/166* (2013.01)

(58) Field of Classification Search
CPC .... B60W 30/16; B60W 30/095; B60W 40/04; B60W 2554/80; B60W 2556/65; B60W 2040/0881; G08G 1/16; B60R 21/00; G01S 2007/4034; G01S 2007/403; G01S 17/931; G01S 7/4026; G01S 2013/9316; G01S 2013/9323; G01S 2013/9324
See application file for complete search history.

(56) References Cited

U.S. PATENT DOCUMENTS

| | | | |
|---|---|---|---|
| 2006/0108154 A1* | 5/2006 | Mack | .................... B60W 40/13 177/136 |
| 2013/0293394 A1 | 11/2013 | Rubin et al. | |
| 2013/0307986 A1 | 11/2013 | Numata et al. | |
| 2014/0231166 A1 | 8/2014 | Miller et al. | |
| 2014/0257867 A1 | 9/2014 | Gay et al. | |
| 2015/0224845 A1* | 8/2015 | Anderson | ............ B60G 17/052 701/37 |
| 2015/0242552 A1* | 8/2015 | Kozloski | ................. H04L 67/12 703/8 |
| 2020/0031339 A1 | 1/2020 | Tanaka et al. | |

FOREIGN PATENT DOCUMENTS

| | | | |
|---|---|---|---|
| DE | 10 2012 008 659 A1 | | 11/2012 |
| DE | 10 2013 010 233 A1 | | 12/2014 |
| JP | 7-325987 A | | 12/1995 |
| JP | 11-339192 A | | 12/1999 |
| JP | 2005-313708 A | | 11/2005 |
| JP | 2007-062475 A | | 3/2007 |
| JP | 2009-166616 A | | 7/2009 |
| JP | 2012-234408 A | | 11/2012 |
| JP | 2012234408 A | * | 11/2012 |
| JP | 2014-078155 A | | 5/2014 |
| JP | 2015-225558 A | | 12/2015 |
| JP | 2016-088423 A | | 5/2016 |
| WO | WO 2012/102391 A1 | | 8/2012 |

OTHER PUBLICATIONS

International Search Report and English translation thereof dated Sep. 5, 2017 in connection with International Application No. PCT/JP2017/028672.

International Written Opinion and English translation thereof dated Sep. 5, 2017 in connection with International Application No. PCT/JP2017/028672.

International Search Report and English translation thereof dated Nov. 14, 2017 in connection with International Application No. PCT/JP2017/028671.

International Written Opinion and English translation thereof dated Nov. 14, 2017 in connection with International Application No. PCT/JP2017/028671.

International Preliminary Report on Patentability and English translation thereof dated Mar. 7, 2019 in connection with International Application No. PCT/JP2017/028672.

International Preliminary Report on Patentability and English translation thereof dated Mar. 7, 2019 in connection with International Application No. PCT/JP2017/028671.

Extended European Search Report dated Jun. 26, 2019 in connection with European Application No. 17843385.0.

Extended European Search Report dated Jun. 26, 2019 in connection with European Application No. 17843384.3.

* cited by examiner

| Terminal ID | Time information | Position information | Mobile body type information | Driving mode information | Number-of-occupants information | Travelling information | Driver attribute information |
|---|---|---|---|---|---|---|---|
| Vehicle ID | Transmission time | Latitude and longitude | General vehicle Large vehicle Two-wheeled vehicle | Manual driving Supported driving Automated driving | Number of occupants | Travelling Sudden braking Being stopped | Weak people Elderly person Healthy person |

Q11:
| Adult | Adult |
|---|---|
| | |

Front 4 [m]
Rear 2
Left 2
Right 2

Q12:
| Child | Adult |
|---|---|
| | |

Front 5
Rear 2
Left 4
Right 2

Q13:
| Adult | |
|---|---|
| Child | |

Front 4
Rear 4
Left 4
Right 2

Q31:
| Adult | Adult | Front 10 Rear 7 Left 3 Right 3 |
| Adult | Adult | |

Q32:
| Adult | Adult | Front 10 Rear 8 Left 4 Right 4 |
| Child | Child | |

Q33:
| Adult | Adult | Front 10 Rear 8 Left 3 Right 4 |
| Adult | Child | |

FIG.13

DRIVING ASSISTANT APPARATUS, DRIVING ASSISTANT METHOD, MOVING OBJECT, AND PROGRAM

CROSS-REFERENCE TO RELATED APPLICATIONS

This application claims the benefit under 35 U.S.C. § 371 as a U.S. National Stage Entry of International Application No. PCT/JP2017/028672, filed in the Japanese Patent Office as a Receiving Office on Aug. 8, 2017, which claims priority to Japanese Patent Application Number JP2016-162056, filed in the Japanese Patent Office on Aug. 22, 2016, each of which is hereby incorporated by reference in its entirety.

TECHNICAL FIELD

The present technology relates to a driving assistant apparatus, a driving assistant method, a moving object, and a program, and particularly to a driving assistant apparatus, a driving assistant method, a moving object, and a program that make it possible to perform appropriate driving assistant.

BACKGROUND ART

In the past, a driving assistant function for assisting driving of a vehicle such as a passenger car has been known.

For example, by performing, as driving assistant, driving assistant that avoids a collision between a host vehicle and another vehicle travelling around the host vehicle, such as control of the distance between vehicles, it is possible to prevent a collision accident or the like from occurring.

Further, an inter-vehicle communication technology in which a host vehicle acquires, from a peripheral vehicle travelling around the host vehicle, information regarding the peripheral vehicle by performing communication between the vehicles has also been proposed (see, for example, Patent Literature 1). Since also information regarding a peripheral vehicle is necessary to perform appropriate driving assistant, it is useful to acquire information regarding the peripheral vehicle by such inter-vehicle communication.

CITATION LIST

Patent Literature

Patent Literature 1: Japanese Patent Application Laid-open No. 2007-62475

DISCLOSURE OF INVENTION

Technical Problem

Incidentally, although the state of a host vehicle or a peripheral vehicle greatly affects the occurrence of a collision accident, information necessary for driving assistant differs depending on the situation. However, in the above-mentioned technology, it has been difficult to selectively acquire necessary information to appropriately perform driving assistant.

The present technology has been made in view of the above-mentioned circumstances and it is an object thereof to make it possible to perform appropriate driving assistant.

Solution to Problem

A driving assistant apparatus according to a first aspect of the present technology includes a control unit that performs, on a basis of peripheral vehicle information regarding a peripheral vehicle present in an area corresponding to the number of occupants in a host vehicle, driving assistant processing of the host vehicle.

The area may be determined to be wider as the number of occupants in the host vehicle increases.

The driving assistant processing may be processing for avoiding a collision between the host vehicle and the peripheral vehicle.

The peripheral vehicle information may be information including at least one of information indicating a travelling state of the peripheral vehicle, information indicating the number of occupants of the peripheral vehicle, information indicating a type of the peripheral vehicle, information indicating a driving mode of the peripheral vehicle, or information indicating an attribute of a driver of the peripheral vehicle.

The control unit may determine the area on a basis of the number of occupants in the host vehicle.

The control unit may determine the area on a basis of the number of occupants in the host vehicle, and a boarding position of an occupant in the host vehicle or an attribute of the occupant.

The control unit may perform the driving assistant processing on a basis of the peripheral vehicle information of the peripheral vehicle in the area determined on a basis of the number of occupants in the host vehicle, out of pieces of peripheral vehicle information received from peripheral vehicles in a predetermined area wider than the area.

The control unit may acquire pieces of peripheral vehicle information of peripheral vehicles in a predetermined area, and then further acquire, in a case where the area determined on a basis of the number of occupants of the host vehicle is wider than the predetermined area, the peripheral vehicle information of the peripheral vehicle in the determined area.

The control unit may select, on a basis of the number of occupants in the host vehicle, a type of information to be used for the driving assistant processing out of pieces of information included in the peripheral vehicle information of the peripheral vehicle, for each distance to the peripheral vehicle or each lane in which the peripheral vehicle travels.

The control unit may further control presentation of information regarding the area.

A driving assistant method or a program according to the first aspect of the present technology includes the step of performing, on a basis of peripheral vehicle information regarding a peripheral vehicle present in an area corresponding to the number of occupants in a host vehicle, driving assistant processing of the host vehicle.

In the first aspect of the present technology, on a basis of peripheral vehicle information regarding a peripheral vehicle present in an area corresponding to the number of occupants in a host vehicle, driving assistant processing of the host vehicle is performed.

A moving object according to a second aspect of the present technology includes a control unit that performs, on a basis of peripheral vehicle information regarding a peripheral vehicle present in an area corresponding to the number of occupants in a host vehicle, driving assistant processing of the host vehicle.

In the second aspect of the present technology, on a basis of peripheral vehicle information regarding a peripheral vehicle present in an area corresponding to the number of occupants in a host vehicle, driving assistant processing of the host vehicle is performed.

Advantageous Effects of Invention

In accordance with the first aspect and the second aspect of the present technology, it is possible to perform appropriate driving assistant.

It should be noted that the effect described here is not necessarily limitative and may be any effect described in the present disclosure.

BRIEF DESCRIPTION OF DRAWINGS

FIG. 6 is a diagram describing peripheral vehicle information.

FIG. 11 is a diagram describing a method of determining the reception area.

FIG. 13 is a diagram describing the method of determining the reception area.

MODE(S) FOR CARRYING OUT THE INVENTION

Hereinafter, embodiments to which the present technology is applied will be described with reference to the drawings.

First Embodiment

<Configuration Example of Vehicle>

The present technology makes it possible to realize appropriate driving assistant by receiving peripheral vehicle information from a peripheral vehicle in an area (range) according to the number of occupants in a host vehicle to perform driving assistant processing for avoiding a collision between the host vehicle and the peripheral vehicle on the basis of the received peripheral vehicle information.

Note that the term "driving assistant" as used herein represents travelling control performed during driving of a vehicle at an arbitrary driving mode such as assisted driving and automated driving. In the following, the case where driving assistant processing is appropriately executed while a vehicle to which the present technology is applied performs assisted driving will be described as an example. Further, in the following, the case where the present technology is applied to a passenger car (automobile) will be described as an example. However, the present technology is applicable to moving objects such as motorcycles, bicycles, electric wheelchairs, personal mobility, airplanes, ships, and robots in addition to automobiles such as electric cars and hybrid electric vehicles.

Hereinafter, more specific embodiment will be described.

Figure 1:
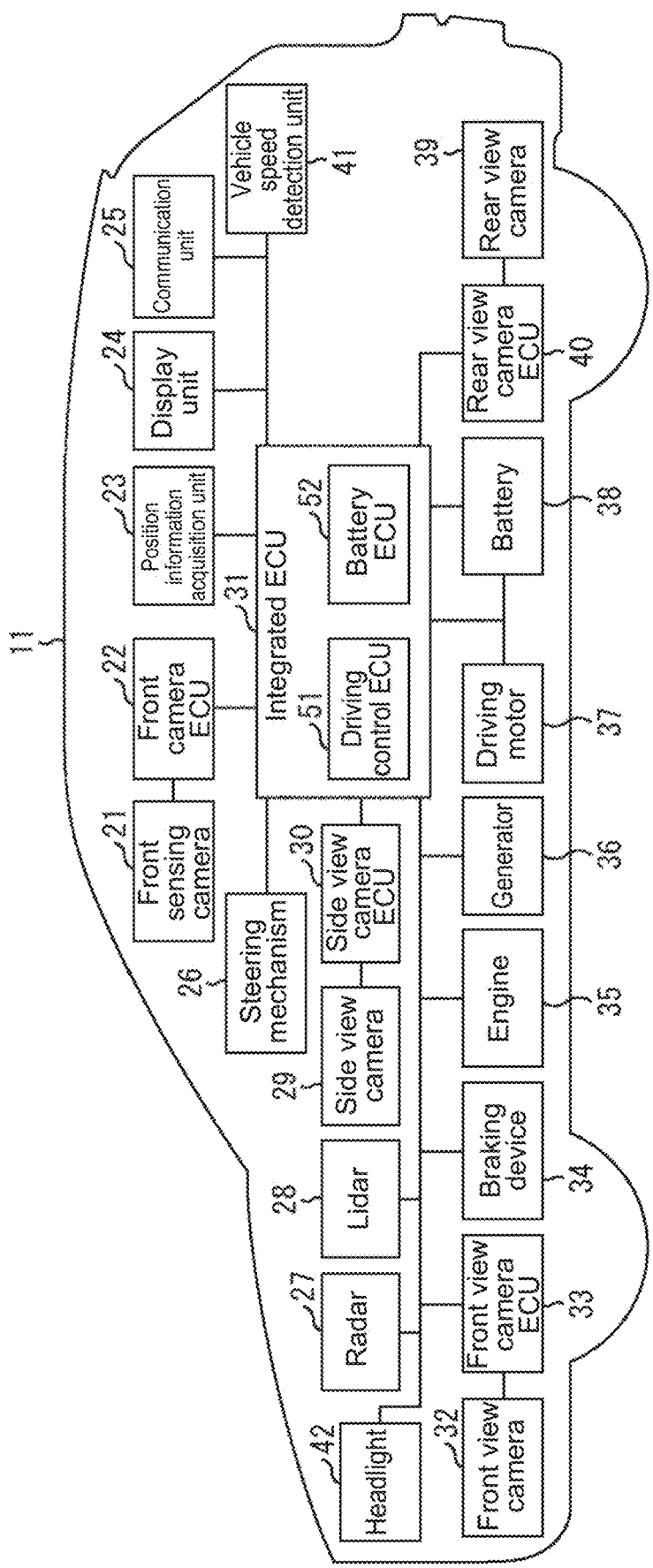
FIG. 1 is a diagram showing a configuration example of a vehicle.

FIG. 1 is a diagram showing a configuration example of an embodiment of a vehicle to which the present technology is applied.

A vehicle 11 shown in FIG. 1 includes a front sensing camera 21, a front camera ECU (Electronic Control Unit) 22, a position information acquisition unit 23, a display unit 24, a communication unit 25, a steering mechanism 26, a radar 27, a lidar 28, a side view camera 29, a side view camera ECU 30, an integrated ECU 31, a front view camera 32, a front view camera ECU 33, a braking device 34, an engine 35, a generator 36, a driving motor 37, a battery 38, a rear view camera 39, a rear view camera ECU 40, a vehicle speed detection unit 41, and a headlight 42.

The units provided in the vehicle 11 are connected to each other by a bus for CAN (Controller Area Network) communication, another connection line, and the like. However, in order to make the figure easy to see, the bus, the connection line, and the like are drawn without particularly distinguishing them.

The front sensing camera 21 includes, for example, a camera dedicated to sensing disposed in the vicinity of a room mirror in the vehicle, images the front of the vehicle 11 as a subject, and outputs the resulting sensing image to the front camera ECU 22.

The front camera ECU 22 appropriately performs processing of improving the image quality or the like on the sensing image supplied from the front sensing camera 21, and then performs image recognition on the sensing image, thereby detecting an arbitrary object such as a white line and a pedestrian from the sensing image. The front camera ECU 22 outputs the result of image recognition to the bus for CAN communication.

The position information acquisition unit 23 includes, for example, a position information measuring system such as a GPS (Global Positioning System), detects the position of the vehicle 11, and outputs the position information indicating the detection result to the bus for CAN communication.

The display unit 24 includes, for example, a liquid crystal display panel, and is disposed at a predetermined position in the vehicle such as the center position of an instrument panel and the inside of a room mirror. Further, the display unit 24 may be a transmissive display superimposed and provided on a windshield part, or a display of a car navigation system. The display unit 24 displays various images under the control of the integrated ECU 31.

The communication unit 25 transmits/receives information to/from a peripheral vehicle, a portable terminal device possessed by a pedestrian, a roadside device, or an external server by various kinds of wireless communication such as inter-vehicle communication, vehicle-to-pedestrian communication, and road-to-vehicle communication. For example, the communication unit 25 performs inter-vehicle communication with a peripheral vehicle, receives, from the peripheral vehicle, peripheral vehicle information including information indicating the number of occupants and the travelling state, and supplies it to the integrated ECU 31.

The steering mechanism 26 performs control of the traveling direction of the vehicle 11, i.e., steering angle control, in accordance with the driver's steering wheel operation or the control signal supplied from the integrated ECU 31. The radar 27 is a distance measuring sensor that measures the distance to an object such as a vehicle and a pedestrian in each direction such as forward and backward by using electromagnetic waves such as millimeter waves, and outputs the result of measuring the distance to the object to the integrated ECU 31 or the like. The lidar 28 is a distance measuring sensor that measures the distance to an object such as a vehicle and a pedestrian in each direction such as forward and backward by using light waves, and outputs the result of measuring the distance to the object to the integrated ECU 31 or the like.

The side view camera 29 is, for example, a camera disposed in a casing of a side mirror or in the vicinity of the side mirror, captures an image of the side (hereinafter, referred to also as the side image) of the vehicle 11 including an area to be a blind spot of the driver, and supplies it to the side view camera ECU 30.

The side view camera ECU 30 performs image processing of improving the image quality such as white balance adjustment on the side image supplied from the side view camera 29, and supplies the obtained side image to the integrated ECU 31 via a cable different from the bus for CAN communication.

The integrated ECU 31 includes a plurality of ECUs such as a driving control ECU 51 and a battery ECU 52 arranged at the center of the vehicle 11, and controls the operation of the entire vehicle 11.

For example, the driving control ECU 51 is an ECU realizing an ADAS (Advanced Driving Assistant System) function or an automated driving (Self driving) function, and controls the driving (travelling) of the vehicle 11 on the basis of various kinds of information such as the image recognition result from the front camera ECU 22, the position information from the position information acquisition unit 23, the peripheral vehicle information supplied from the communication unit 25, the measurement results from the radar 27 and the lidar 28, the result of detecting the vehicle speed from the vehicle speed detection unit 41, and the like. That is, the driving control ECU 51 controls the steering mechanism 26, the braking device 34, the engine 35, the driving motor 37, and the like to control the driving of the vehicle 11. Further, the driving control ECU 51 controls, on the basis of presence or absence of head light of the oncoming vehicle, or the like, which is supplied from the front camera ECU 22 as the image recognition result, the headlight 42 to control beam application by the headlight 42 such as switching between a high beam and a low beam.

Note that in the integrated ECU 31, a dedicated ECU may be provided for each of the functions including the ADAS function, the automated driving function, and the beam control.

Further, the battery ECU 52 controls power supply or the like by the battery 38.

The front view camera 32 includes, for example, a camera disposed in the vicinity of a front grille, captures an image of the front (hereinafter, referred to also as the front image) of the vehicle 11 including an area to be a blind spot of the driver, and supplies it to the front view camera ECU 33.

The front view camera ECU 33 performs image processing of improving the image quality such as white balance adjustment on the front image supplied from the front view camera 32, and supplies the obtained front image to the integrated ECU 31 via a cable different from the bus for CAN communication.

The braking device 34 operates in accordance with the driver's braking operation or the control signal supplied from the integrated ECU 31, and stops or decelerates the vehicle 11. The engine 35 is a power source of the vehicle 11, and is driven in accordance with the control signal supplied from the integrated ECU 31.

The generator 36 is controlled by the integrated ECU 31, and generates power in accordance with driving of the engine 35. The driving motor 37 is a power source of the vehicle 11, receives power supply from the generator 36 or the battery 38, and is driven in accordance with the control signal supplied from the integrated ECU 31. Note that whether to drive the engine 35 or the driving motor 37 during travelling of the vehicle 11 is appropriately switched by the integrated ECU 31.

The battery 38 includes, for example, a battery of 12 V or a battery of 200 V, and supplies power to the respective units of the vehicle 11 in accordance with the control of the battery ECU 52.

The rear view camera 39 includes, for example, a camera disposed in the vicinity of a license plate of a tailgate, captures an image of the rear side (hereinafter, referred to also as the rear image) of the vehicle 11 including an area to be a blind spot of the driver, and supplies it to the rear view camera ECU 40. For example, the rear view camera 39 is activated when a shift lever (not shown) is moved to the position of the reverse (R).

The rear view camera ECU 40 performs image processing of improving the image quality such as white balance adjustment on the rear image supplied from the rear view camera 39, and supplies the obtained rear image to the integrated ECU 31 via a cable different from the bus for CAN communication.

The vehicle speed detection unit 41 is a sensor that detects the vehicle speed of the vehicle 11, and supplies the result of detecting the vehicle speed to the integrated ECU 31. Note that in the vehicle speed detection unit 41, from the result of detecting the vehicle speed, the acceleration, or the differential of the acceleration may be calculated. For example, the calculated acceleration is used for estimating the time until the collision of the vehicle 11 with an object.

The headlight 42 operates in accordance with the control signal supplied rom the integrated ECU 31, and illuminates the front of the vehicle 11 by outputting a beam.

Figure 2:
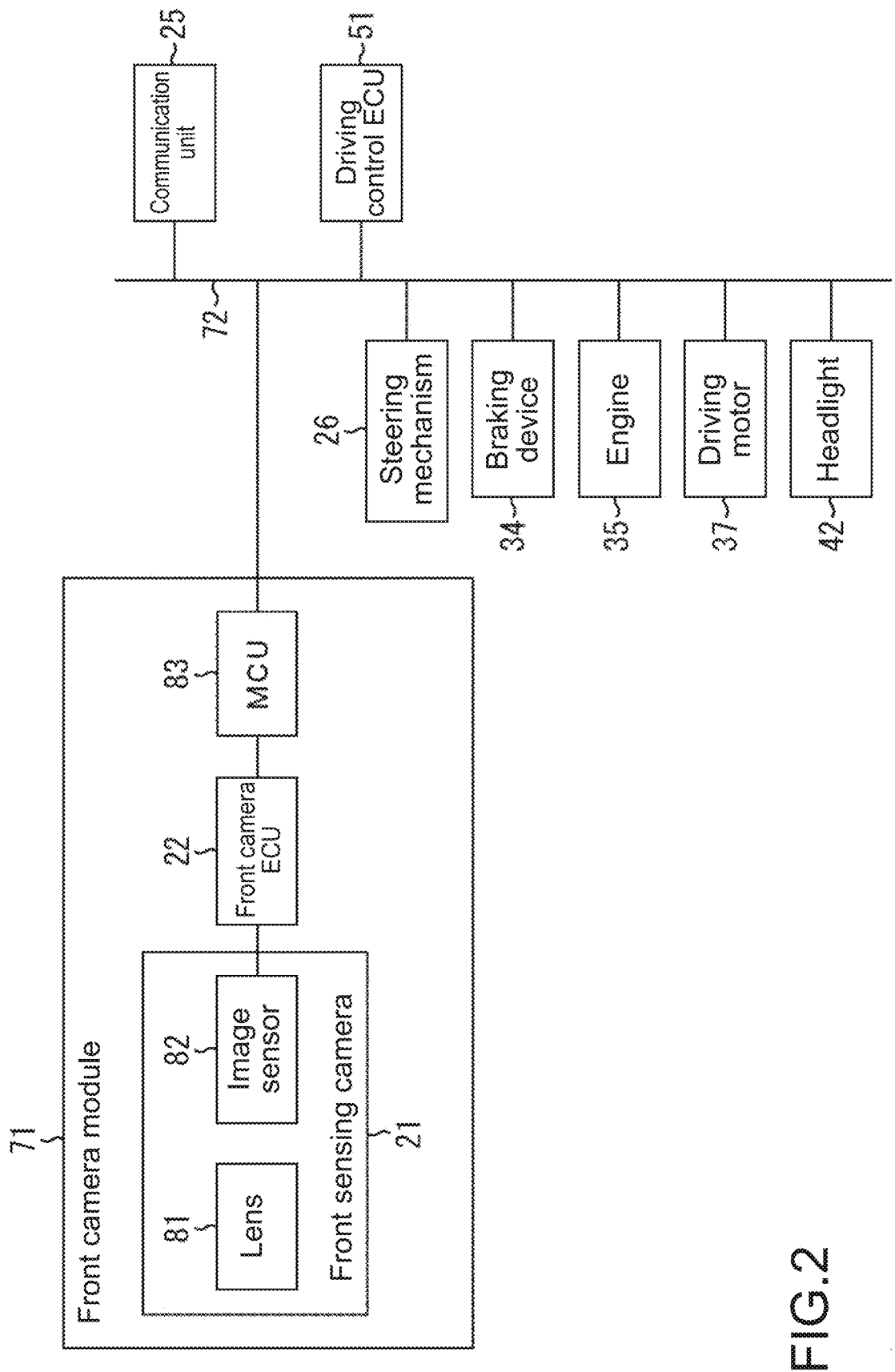
FIG. 2 is a diagram describing blocks connected to a bus for CAN communication.

Further, in the vehicle 11, as shown in FIG. 2, a plurality of units including a front camera module 71, the communication unit 25, the driving control ECU 51, the steering mechanism 26, the braking device 34, the engine 35, the driving motor 37, and the headlight 42 are connected to each other via a bus 72 for CAN communication. Note that the components corresponding to those in FIG. 1 are denoted by the same reference symbols in FIG. 2, and description thereof will be appropriately omitted.

In this example, the front camera module 71 includes a lens 81, an image sensor 82, the front camera ECU 22, and an MCU (Module Control Unit) 83.

Further, the lens 81 and the image sensor 82 constitute the front sensing camera 21, and the image sensor 82 includes, for example, a CMOS (Complementary Metal Oxide Semiconductor) image sensor.

In the front camera module 71, light from a subject is collected on the imaging surface of the image sensor 82 by the lens 81. The image sensor 82 captures a sensing image by photoelectrically converting light that has entered from the lens 81, and supplies it to the front camera ECU 22.

The front camera ECU 22 performs, for example, gain adjustment, white balance adjustment, HDR (High Dynamic Range) processing, and the like on the sensing image supplied from the image sensor 82, and then performs image recognition on the sensing image.

In the image recognition, for example, a white line, a curb stone, a pedestrian, a vehicle, a headlight, a brake light, a road sign, a time until a collision with the forward vehicle, and the like are recognized (detected). The recognition results of the image recognition are converted into signals in a format for CAN communication by the MCU 83, and output to the bus 72.

Further, information supplied from the bus 72 is converted into a signal in a format defined for the front camera module 71 by the MCU 83, and supplied to the front camera ECU 22.

The driving control ECU 51 appropriately controls the steering mechanism 26, the braking device 34, the engine 35, the driving motor 37, the headlight 42, and the like on the basis of the result of image recognition output from the MCU 83 to the bus 72 and information supplied from other units such as the radar 27 and the lidar 28. Accordingly, driving control such as change of the travelling direction, braking, acceleration, and starting, warning notification control, beam switching control, and the like are realized.

Further, in the case where the driving control ECU 51 realizes the automated driving function or the like, for example, the locus of the position of the target object may be further recognized by the driving control ECU 51 from the image recognition result at each time obtained by the front camera ECU 22, and such a recognition result may be transmitted to an external server via the communication unit 25. In such a case, for example, in the server, learning such as a deep neural network is performed, and a necessary dictionary or the like is generated and transmitted to the vehicle 11. In the vehicle 11, the dictionary or the like obtained in this way is received by the communication unit 25, and the received dictionary or the like is used for various predictions and the like in the driving control ECU 51.

Note that of the controls performed by the driving control ECU 51, control that can be realized from only the result of image recognition on the sensing image may be performed not by the driving control ECU 51 but by the front camera ECU 22.

Specifically, for example, the front camera ECU 22 may control the headlight 42 on the basis of the presence or absence of headlight of the oncoming vehicle, which is obtained by the image recognition on the sensing image. In this case, for example, the front camera ECU 22 generates a control signal that instructs switching between a low beam and a high beam, or the like, and supplies the control signal to the headlight 42 via the MCU 83 and the bus 72, thereby controlling the beam switching by the headlight 42.

Alternatively, for example, the front camera ECU 22 may generate a warning notice of a collision against an object and a warning notice of departure from the travelling lane (lane) on the basis of the result of recognizing a white line, a curb stone, a pedestrian, and the like, which is obtained by the image recognition on the sensing image, and output it to the bus 72 via the MCU 83, thereby controlling the warning notice. In this case, the warning notice output from the front camera ECU 22 is supplied to, for example, the display unit 24 or a speaker (not shown). Accordingly, it is possible to display a warning on the display unit 24 or output a warning message through the speaker.

Further, in the vehicle 11, by displaying a composite image on the display unit 24 at the time of parking, for example, the around view monitor function is realized.

Figure 3:
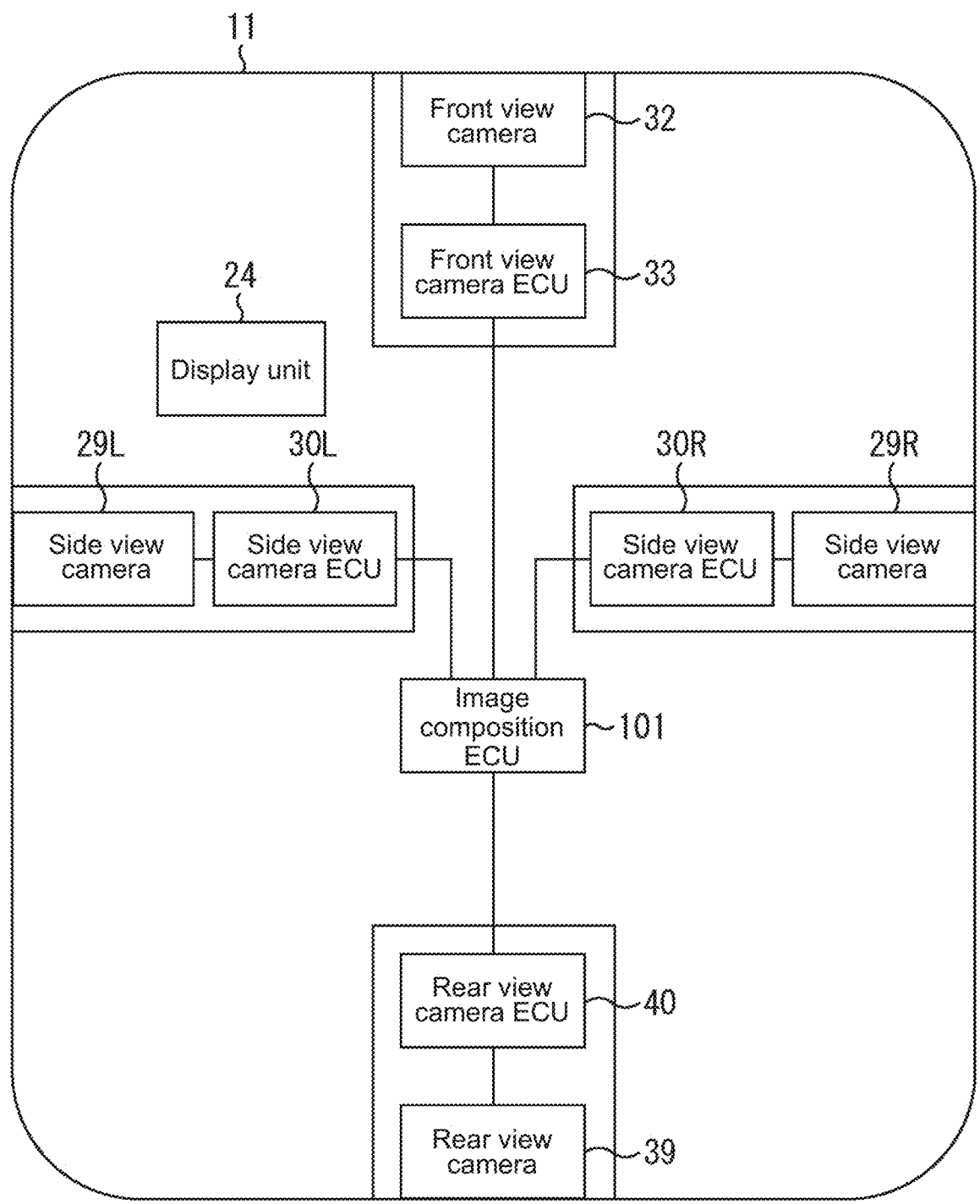
FIG. 3 is a diagram describing an around view monitor function.

That is, as shown in FIG. 3, the front image, the rear image, and the side image obtained by the respective units are supplied, via a cable different from the bus for CAN communication, to an image composition ECU 101 provided in the integrated ECU 31, and a composite image is generated from the images. Note that the components corresponding to those in FIG. 1 are denoted by the same reference symbols in FIG. 3, and description thereof will be appropriately omitted.

In FIG. 3, as the side view camera 29 shown in FIG. 1, a side view camera 29L disposed on the left side of the vehicle 11 and a side view camera 29R disposed on the right side of the vehicle 11 are provided. Further, as the side view camera ECU 30, a side view camera ECU 30L disposed on the left side of the vehicle 11 and a side view camera ECU 30R disposed on the right side of the vehicle 11 are provided.

To the image composition ECU 101, the front image obtained by the front view camera 32 is supplied from the front view camera ECU 33 and the rear image obtained by the rear view camera 39 is supplied from the rear view camera ECU 40. Further, to the image composition ECU 101, the side image obtained by the side view camera 29L (hereinafter, particularly referred to also as the left side image) is supplied from the side view camera ECU 30L and the side image obtained by the side view camera 29R (hereinafter, particularly referred to also as the right side image) is supplied from the side view camera ECU 30R.

The image composition ECU 101 generates, on the basis of the supplied images, a composite image in which the front image, the rear image, the left side image, and the right side image are arranged in corresponding areas, and supplies the obtained composite image to the display unit 24 for display. The driver is capable of safely and easily parking the vehicle 11 by driving the vehicle 11 while watching the composite image displayed in this way. Note that the integrated ECU 31 may control the driving of the vehicle 11 on the basis of the composite image, and park the vehicle 11.

Figure 4:
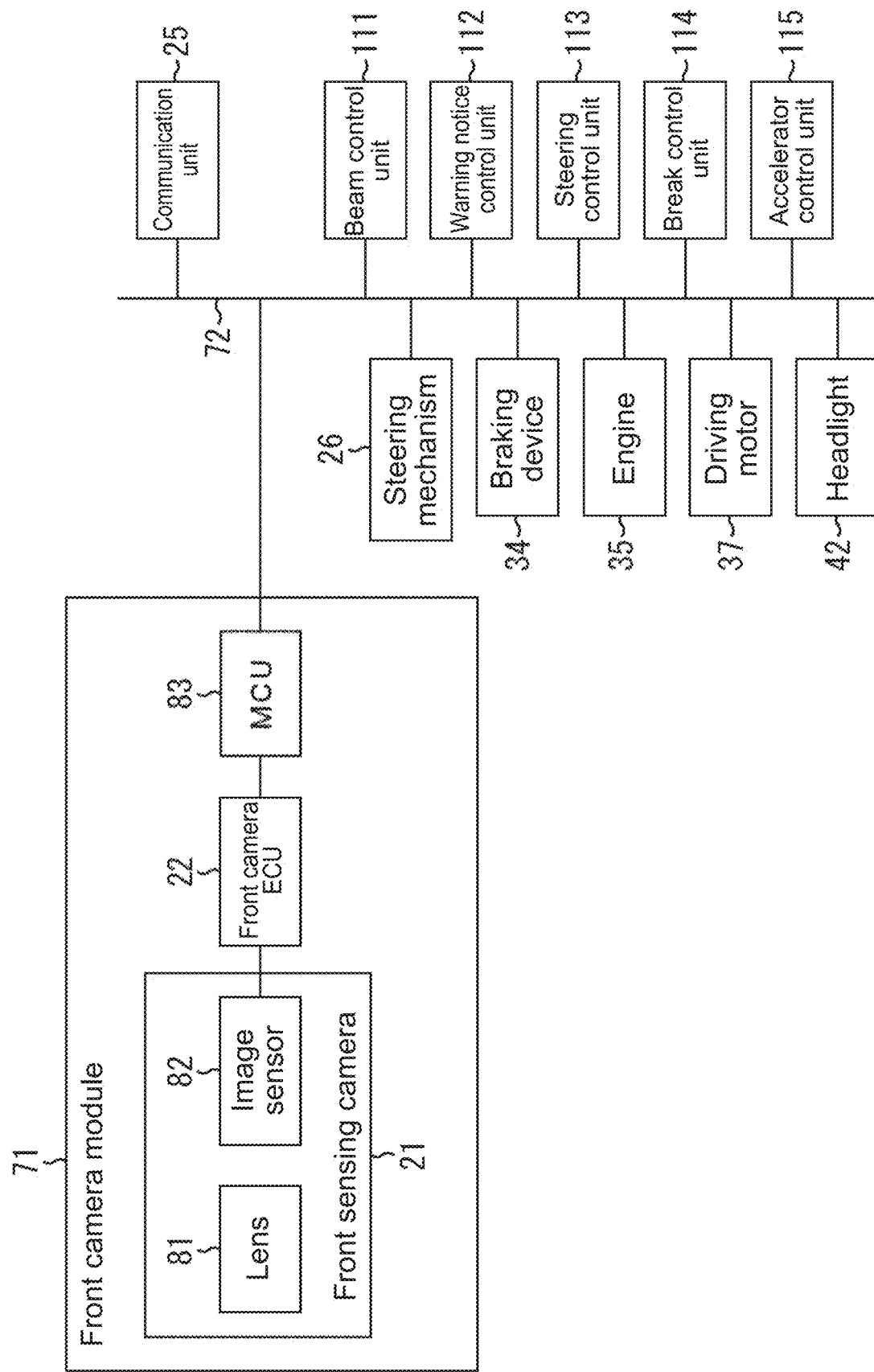
FIG. 4 is a diagram describing another example of the blocks connected to the bus for CAN communication.

Further, the driving control ECU 51 does not necessarily need to control the plurality of different functions. For example, as shown in FIG. 4, a control unit may be provided for control content, i.e., each function. Note that the components corresponding to those in FIG. 2 are denoted by the same reference symbols in FIG. 4, and description thereof will be appropriately omitted.

In the example shown in FIG. 4, to the bus 72 for CAN communication, a plurality of units including the front camera module 71, the communication unit 25, the steering mechanism 26, the braking device 34, the engine 35, the driving motor 37, the headlight 42, a beam control unit 111, a warning notice control unit 112, a steering control unit 113, a break control unit 114, and an accelerator control unit 115 are connected.

In this example, the control performed by the driving control ECU 51 in the example shown in FIG. 2 is shared and performed by the beam control unit 111, the warning notice control unit 112, the steering control unit 113, the break control unit 114, and the accelerator control unit 115.

Specifically, for example, the beam control unit 111 performs control of switching a low beam and a high beam by controlling the headlight 42 on the basis of the result of image recognition, which is obtained by the front camera ECU 22. Further, the warning notice control unit 112 controls the warning notice such as displaying of various warnings on the display unit 24 and outputting a warning message by the speaker (not shown), on the basis of the result of image recognition, which is obtained by the front camera ECU 22.

The steering control unit 113 controls the travelling direction of the vehicle 11 by controlling the steering mechanism 26 on the basis of the result of image recognition, which is obtained by the front camera ECU 22, the measurement results from the radar 27 and the lidar 28, and the like. The break control unit 114 controls the stop and deceleration of the vehicle 11 by controlling the braking device 34 on the basis of the result of image recognition, which is obtained by the front camera ECU 22, the measurement results from the radar 27 and the lidar 28, and the like.

Further, the accelerator control unit 115 controls starting and acceleration of the vehicle 11 by controlling the engine 35 and the driving motor 37 on the basis of the result of image recognition, which is obtained by the front camera ECU 22, the measurement results from the radar 27 and the lidar 28, and the like.

<Functional Configuration Example of Vehicle>

Figure 5:
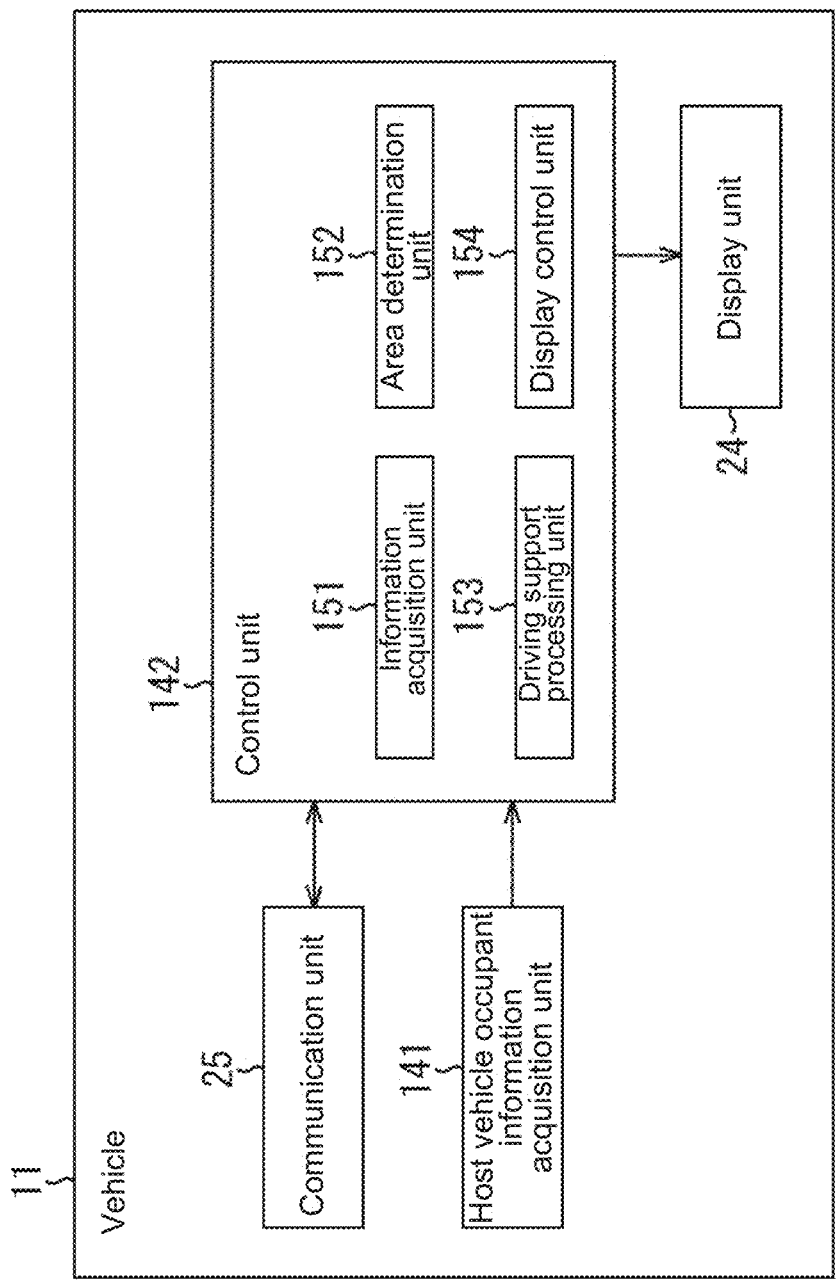
FIG. 5 is a diagram showing a functional configuration example of the vehicle.

Next, a functional configuration example for the vehicle 11 shown in FIG. 1 to perform driving assistant to avoid a collision with a peripheral vehicle will be described. FIG. 5 is a diagram showing a functional configuration example of the vehicle 11 in such a case. Note that the components corresponding to those in FIG. 1 are denoted by the same reference symbols in FIG. 5, and description thereof will be appropriately omitted.

The vehicle 11 shown in FIG. 5 includes the communication unit 25, a host vehicle occupant information acquisition unit 141, a control unit 142, and the display unit 24, and functions as a driving assistant apparatus that performs driving assistant.

The host vehicle occupant information acquisition unit 141 acquires host vehicle occupant information including information indicating the number of occupants in the vehicle 11, information indicating the boarding positions of the occupants in the vehicle 11, and information indicating the attributes of the occupants, and supplies it to the control unit 142. Here, the attributes of the occupants represent, for example, whether the occupant is an adult or a child.

For example, the host vehicle occupant information acquisition unit 141 includes an indoor camera, and detects a person from an indoor image obtained by imaging the interior of the vehicle 11 to acquire the host vehicle occupant information from the detection result. Alternatively, the host vehicle occupant information acquisition unit 141 may detect a seat belt wearing state in the interior of the vehicle 11 to acquire the host vehicle occupant information from the detection result. Further, the host vehicle occupant information acquisition unit 141 may acquire the host vehicle occupant information on the basis of the operation input of the number of occupants or the boarding position by the occupant or the like.

The control unit 142 is realized by, for example, the integrated ECU 31 shown in FIG. 1, particularly by the driving control ECU 51, and executes driving assistant processing performed in the vehicle 11. The control unit 142 includes an information acquisition unit 151, an area determination unit 152, a driving assistant processing unit 153, and a display control unit 154.

The information acquisition unit 151 appropriately controls the communication unit 25 to receive the peripheral vehicle information by inter-vehicle communication with a peripheral vehicle present around the vehicle 11, and acquires the received peripheral vehicle information from the communication unit 25. The peripheral vehicle information may be acquired at regular intervals, i.e., periodically, or may be acquired irregularly.

The area determination unit 152 determines, on the basis of the host vehicle occupant information, a reception area that is a range for receiving the peripheral vehicle information by inter-vehicle communication. In other words, the area determination unit 152 changes the reception area for receiving the peripheral vehicle information, depending on the number of occupants, or the like indicated by the host vehicle occupant information. Here, the reception area is an area in a predetermined range centering on the vehicle 11.

The driving assistant processing unit 153 performs, on the basis of the peripheral vehicle information acquired by the information acquisition unit 151, driving assistant processing that is processing of controlling the travelling of the vehicle 11.

This driving assistant processing is processing for avoiding a collision between the vehicle 11 and a peripheral vehicle, for example. Specifically, for example, processing of controlling the distance between the vehicle 11 and peripheral vehicles travelling in front of and behind the vehicle 11, processing of controlling the lane change of the vehicle 11, processing of controlling the sudden breaking of the vehicle 11, i.e., sudden stop or abrupt deceleration, or the like is performed as the driving assistant processing.

The display control unit 154 controls the display unit 24 to display various images.

<Example of Peripheral Vehicle Information>

Incidentally, in the case where the vehicle 11 performs driving assistant processing, the peripheral vehicle information received from a peripheral vehicle by inter-vehicle communication is used.

This peripheral vehicle information includes one or more types of information regarding the peripheral vehicle. For example, as shown in FIG. 6, the peripheral vehicle information includes information indicating the number of occupants in the peripheral vehicle, information indicating the travelling state of the peripheral vehicle, and the like.

That is, in the example shown in FIG. 6, the peripheral vehicle information includes a terminal ID, time information, position information, moving object type information, driving mode information, number-of-occupants information, travelling information, and driver attribute information as shown in the upper column of the figure.

The terminal ID is a vehicle ID that identifies the peripheral vehicle as the transmission source of the peripheral vehicle information, and the time information is information indicating the transmission time of the peripheral vehicle information.

Further, the position information is information indicating the position such as the latitude and longitude of the peripheral vehicle at the time of transmission of the peripheral vehicle information, and the moving object type information is information indicating the type of the peripheral vehicle, such as a general vehicle, a large vehicle, and a two-wheeled vehicle.

The driving mode information is information indicating which driving mode the peripheral vehicle is driven, such as manual driving, assisted driving, and automated driving, and the number-of-occupants information is information indicating the number of occupants in the peripheral vehicle.

Further, the travelling information is information indicating the travelling state of the peripheral vehicle, such as sudden braking, i.e., sudden stop or abrupt deceleration of the peripheral vehicle, being normally travelling, being stopped, and making a right turn. Note that the travelling information may include information such as the travelling speed of the peripheral vehicle.

The driver attribute information is information indicating the attribute of the driver of the peripheral vehicle, such as a healthy person, an elderly person, and other weak people.

Further, although the case where the terminal ID, the time information, the position information, the moving object type information, the driving mode information, the number-of-occupants information, the travelling information, and the driver attribute information are included as examples of the peripheral vehicle information will be described here, the peripheral vehicle information may be any type of information as long as it relates to the peripheral vehicle. For example, the peripheral vehicle information may be one including at least any one of pieces of information shown in FIG. 6.

In the vehicle 11, driving of the vehicle 11 is controlled on the basis of such peripheral vehicle information.

In particular, in the vehicle 11, the reception area is determined corresponding to the number of occupants of the vehicle 11, so that the peripheral vehicle information necessary for avoiding a collision can be selectively acquired. Accordingly, appropriate driving assistant can be realized.

Specifically, for example, in the case where the number of occupants in the vehicle 11 is large, even when the vehicle 11 attempts to stop by braking, not only it takes time until the vehicle 11 completely stops but the vehicle 11 moves in the travelling direction during that time.

Therefore, for example, in the case where the vehicle 11 suddenly stops in response to the sudden stop of the forward vehicle, in order to avoid a collision with the forward vehicle, the vehicle 11 needs to perform sudden braking at an earlier timing as the number of occupants in the vehicle 11 increases.

In such a case, for example, by grasping not only the traveling state of the vehicle in front of the vehicle 11 but also the travelling state of the vehicle positioned two vehicles before the vehicle 11, the vehicle 11 is capable of performing appropriate driving assistant such as sudden braking and deceleration at an earlier timing.

In this regard, the vehicle 11 determines the reception area corresponding to the number of occupants in the vehicle 11, and receives the peripheral vehicle information from the peripheral vehicle in the reception area, thereby making it possible to perform more appropriate driving assistant.

For example, in the case where the number of occupants in the vehicle 11 is two, the range of four meters in front of the vehicle 11 is the reception area. Then, peripheral vehicle information is received from a peripheral vehicle present in the reception area by inter-vehicle communication, and driving assistant for avoiding a collision is performed on the basis of the received peripheral vehicle information.

Meanwhile, for example, in the case where the number of occupants in the vehicle 11 is four, the range of 10 meters in front of the vehicle 11 is the reception area. Then, peripheral vehicle information is received from a peripheral vehicle present in the reception area by inter-vehicle communication, and driving assistant for avoiding a collision is performed on the basis of the received peripheral vehicle information.

At the time of driving assistant, for example, the driving mode information, the travelling information, the driver attribute information, the number-of-occupants information, the moving object type information, and the like of the peripheral vehicle included in the peripheral vehicle information are constantly monitored, and driving of the vehicle 11 is controlled on the basis of the monitoring result.

For example, assumption is made that the vehicle travelling in front of the vehicle 11 is located at a position four meters in front of the vehicle 11 and the travelling vehicle positioned two vehicles before the vehicle 11 is located at a position 10 meters in front of the vehicle 11. Further, assumption is made that the travelling vehicle positioned two vehicles before the vehicle 11 suddenly stops during automated driving and also the vehicle travelling in front of the vehicle 11 suddenly stops accordingly.

At this time, in the case where the reception area is the range of four meters in front of the vehicle 11, since the vehicle 11 cannot acquire the peripheral vehicle information of the vehicle positioned two vehicles before the vehicle 11, the vehicle 11 cannot detect the sudden stop of this vehicle. Therefore, the vehicle 11 will detect the sudden stop of the vehicle in front of the vehicle 11, and suddenly stop.

In this case, when the number of occupants in the vehicle 11 is small, the vehicle 11 is capable of immediately stopping, sufficiently avoiding occurrence of a collision. However, when the number of occupants in the vehicle 11 is large, the vehicle 11 may collide with the vehicle in front of the vehicle 11.

Meanwhile, in the case where the reception area is the range of 10 meters in front of the vehicle 11, the vehicle 11 is capable of acquiring the peripheral vehicle information of the travelling vehicle positioned two vehicles before the vehicle 11, and therefore detecting the sudden stop of this vehicle. Therefore, in this case, the vehicle 11 is capable of stopping without colliding with the vehicle in front of the vehicle 11 by, for example, reducing the travelling speed thereof at the time of detecting the sudden stop of the vehicle positioned two vehicles before the vehicle 11, i.e., before the sudden stop of the vehicle in front of the vehicle 11.

As described above, by widening the reception area as the number of occupants in the vehicle 11 increases, appropriate driving assistant for avoiding a collision can be realized.

Note that in the following, in order to make it easy to distinguish the vehicle 11 and a peripheral vehicle, the vehicle 11 that performs driving assistant processing is referred to also as the host vehicle 11 or the host vehicle as appropriate.

<Description of Driving Control Processing>

Next, a flow of processing in the case of changing the reception area corresponding to the number of occupants in the host vehicle to perform driving assistant as described above will be described. That is, in the following, with reference to the flowchart of FIG. 7, driving control processing performed by the vehicle 11 will be described.

In Step S11, the host vehicle occupant information acquisition unit 141 acquires the host vehicle occupant information indicating the number of occupants in the host vehicle 11, the boarding position of the occupant, and the attribute of the occupant, and supplies it to the control unit 142. For example, the acquisition of the host vehicle occupant information is performed by detection of a person from the indoor image, detection of the seat belt wearing state, an operation input of the number of occupants or the like.

In Step S12, the area determination unit 152 determines the reception area for performing inter-vehicle communication, on the basis of the host vehicle occupant information acquired in Step S11.

For example, the area determination unit 152 determines the reception area so that the reception area is widened as the number of occupants indicated by the host vehicle occupant information increases. Specifically, for example, in the case where the number of occupants in the host vehicle 11 is four, the area in the range of 10 meters in front of and behind the host vehicle 11 is the reception area. In the case where the number of occupants in the host vehicle 11 is two, the area in the range of four meters in front of and behind the host vehicle 11 is the reception area.

In Step S13, the information acquisition unit 151 acquires the peripheral vehicle information of the peripheral vehicle in the reception area determined by the processing of Step S12.

That is, the information acquisition unit 151 controls the communication unit 25 to perform inter-vehicle communication with the peripheral vehicle in the reception area and receive the peripheral vehicle information from the peripheral vehicle. Then, the information acquisition unit 151 acquires the received peripheral vehicle information from the communication unit 25.

In Step S14, the display control unit 154 controls the display unit 24 to display the reception area for the reception area determined by the processing of Step S12. In other words, the control unit 142 controls presentation of information regarding the reception area.

Figure 8:
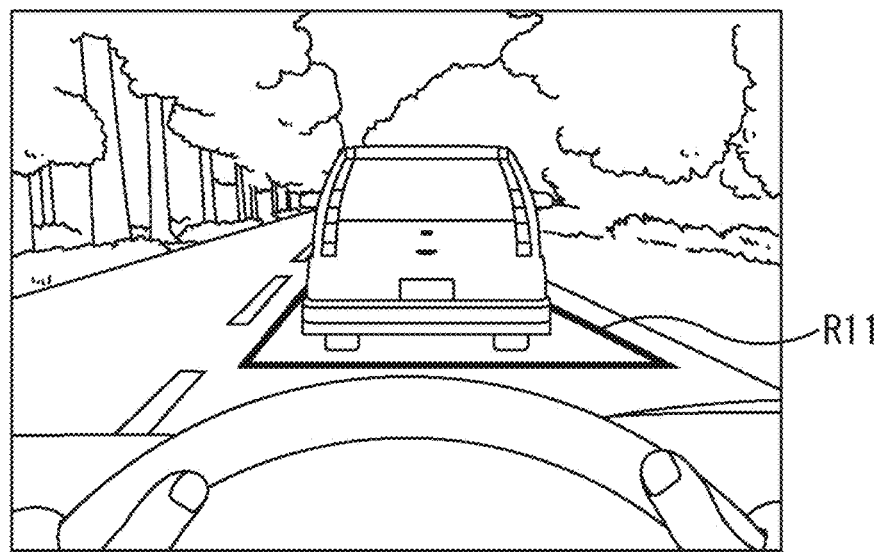
FIG. 8 is a diagram describing a display example of a reception area.

For example, in the case where the display unit 24 is a transmissive display provided on a windshield part, the display control unit 154 causes the display unit 24 to display reception area information R11 indicating the reception area as shown in FIG. 8.

In the example shown in FIG. 8, a frame surrounding an area in a predetermined range of the same lane as that of the host vehicle 11 is displayed as the reception area information R11. By displaying the reception area information R11 in this way, the driver is capable of visually grasping the reception area.

Note that for example, a text message "Four meters ahead, V2V receiving" describing the reception area may be displayed on the display unit 24 together with the reception area information R11, or a voice message describing the reception area may be output. Further, the display control unit 154 may control the display unit 24 to perform such display that makes it possible to visually grasping the peripheral vehicle in the reception area by, for example, surrounding the peripheral vehicle present in the reception area by a frame.

Further, although the range (size) of the area as the reception area is determined corresponding to the number of occupants in the host vehicle 11 here, also whether to include, as the reception area, also the lane adjacent to the lane where the host vehicle travels, or the like may be determined corresponding to the number of occupants of the host vehicle.

Figure 9:
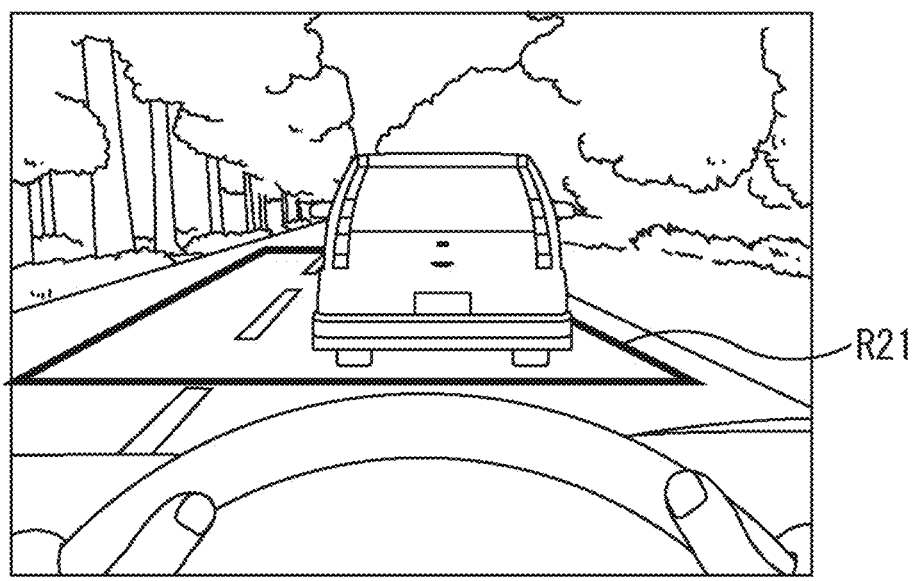
FIG. 9 is a diagram describing a display example of the reception area.

For example, in the case where also the lane adjacent to the lane of the host vehicle 11 is set as the reception area, when the display unit 24 is a transmissive display provided on a windshield part, the display control unit 154 causes the display unit 24 to display reception area information R21 indicating the reception area as shown in FIG. 9.

In this example, a frame surrounding an area in a predetermined range including not only the same lane as that of the host vehicle 11 but also the lane adjacent to this lane is displayed as the reception area information R21.

Further, in displaying the reception area, such display that makes it possible to specify the peripheral vehicle in the reception area, i.e., specify from which peripheral vehicle the peripheral vehicle information is being received may be performed instead of displaying the frame indicating the reception area.

Figure 10:
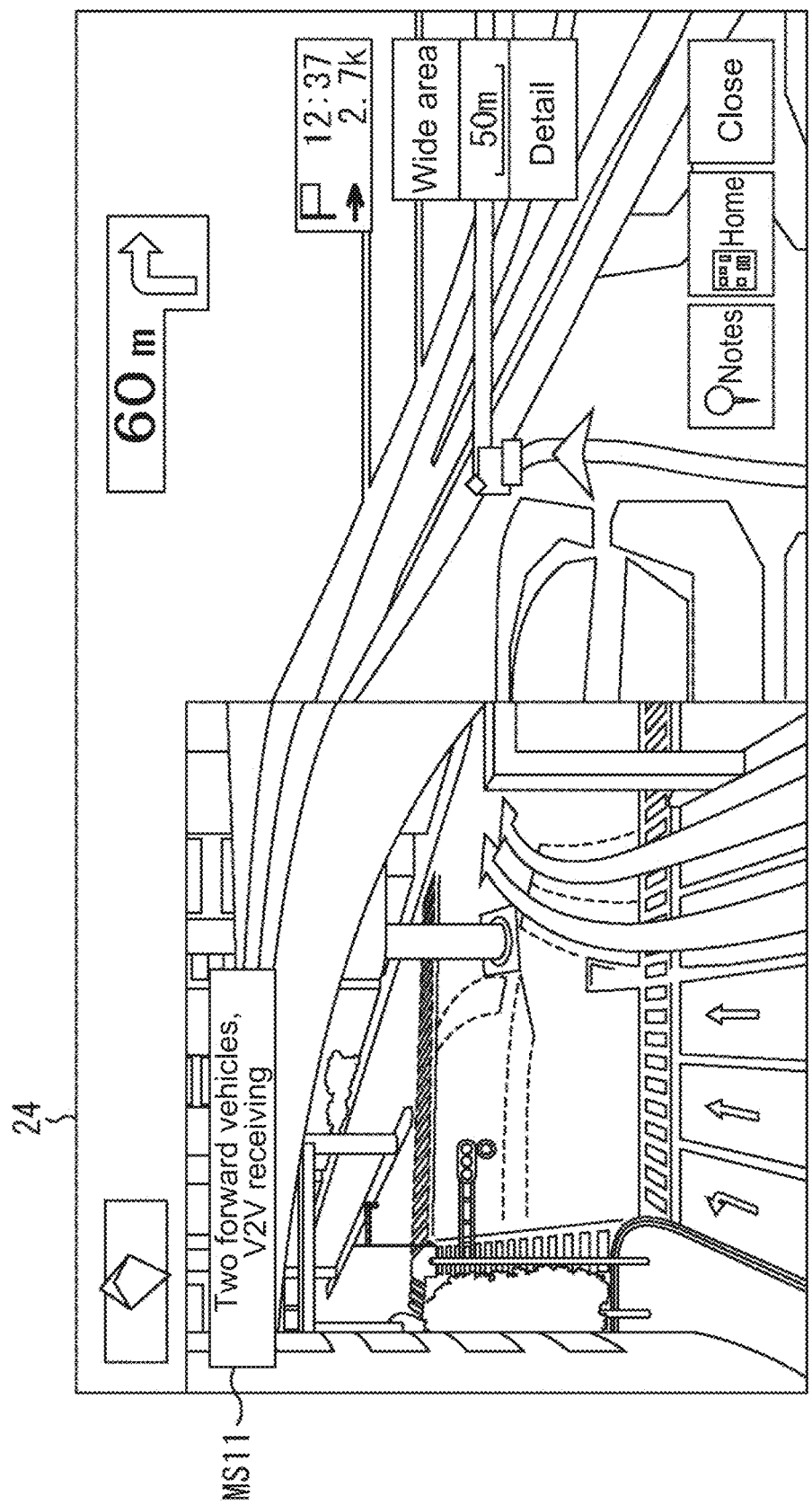
FIG. 10 is a diagram describing a display example of the reception area.

In such a case, for example, the display control unit 154 causes the display unit 24 to display the text message as shown in FIG. 10.

In the example shown in FIG. 10, the display unit 24 is used also as a display of a car navigation system, and a message MS11 describing the reception area is superimposed on the display screen for car navigation and displayed on the display unit 24.

In particular, in this example, a character "Two forward vehicles, V2V receiving" as the message MS11 is displayed in the guidance route part of the host vehicle 11 of the display screen of car navigation. By viewing this message MS11, the driver is capable of instantly grasping that the peripheral vehicle information is being received by inter-vehicle communication (V2V) from two vehicles travelling ahead. That is, the driver is capable of grasping that the two forward vehicles are in the reception area.

Figure 7:
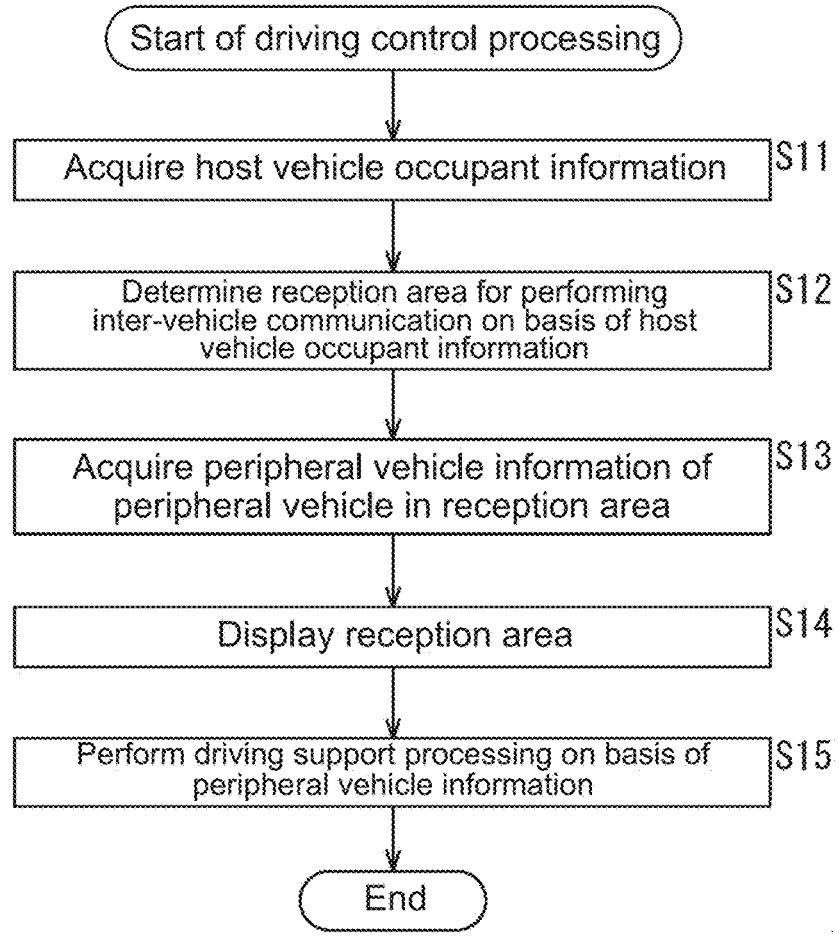
FIG. 7 is a flowchart describing driving control processing.

Returning to description of the flowchart of FIG. 7, in Step S15, the driving assistant processing unit 153 performs driving assistant processing on the basis of the peripheral vehicle information acquired by the processing of Step S13, and the driving control processing is finished.

Specifically, for example, the driving assistant processing unit 153 performs driving assistant processing for avoiding a collision with a peripheral vehicle, on the basis of the moving object type information, the driving mode information, the number-of-occupants information, the travelling information, the driver attribute information, and the like included in the peripheral vehicle information.

As an example, assumption is made that a sudden stop (sudden braking) of the forward vehicle has been detected from the travelling information of the forward vehicle. In such a case, the driving assistant processing unit 153 generates a control signal that instructs sudden braking, supplies it to the braking device 34, and causes the braking device 34 to perform sudden braking, thereby performing processing of controlling the sudden braking as the driving assistant processing for avoiding a collision.

Note that in addition, as the driving assistant processing for avoiding a collision, processing of controlling the distance between the host vehicle 11 and the forward vehicle or backward vehicle, processing of controlling the lane change of the host vehicle 11, or the like may be performed on the basis of the peripheral vehicle information. In such a case, the driving assistant processing unit 153 appropriately generates a control signal for controlling driving, supplies it to necessary blocks among the braking device 34, the engine 35, the driving motor 37, and the steering mechanism 26, and controls driving of the blocks, thereby performing the driving assistant processing for avoiding a collision.

In such a way, the vehicle 11 determines the reception area corresponding to the number of occupants in the host vehicle 11, and receives the peripheral vehicle information from the peripheral vehicle in the determined reception area to perform driving assistant processing. Accordingly, it is possible to perform appropriate driving assistant considering the state of both the host vehicle 11 and the peripheral vehicle which greatly affect occurrence of a collision. In particular, by determining the reception area corresponding to the number of occupants, it is possible to selectively acquire necessary information and perform appropriate driving assistant.

Modified Example 1 of First Embodiment

<Regarding Determination of Reception Area>

Note that in the driving control processing described with reference to FIG. 7, the case where the reception area is determined on the basis of only the number of occupants in the host vehicle 11 has been described. However, the reception area may be determined using not only the number of occupants in the host vehicle 11 but also the attributes and boarding positions of occupants in the host vehicle 11.

For example, the host vehicle occupant information acquired by the host vehicle occupant information acquisition unit 141 includes information indicating the number of occupants, and the attributes and boarding positions of the occupants in the host vehicle 11. Therefore, the area determination unit 152 is capable of grasping, from the host vehicle occupant information, not only how many occupants are in the host vehicle 11 but also what occupant is sitting in which seat of the host vehicle 11.

Figure 12:
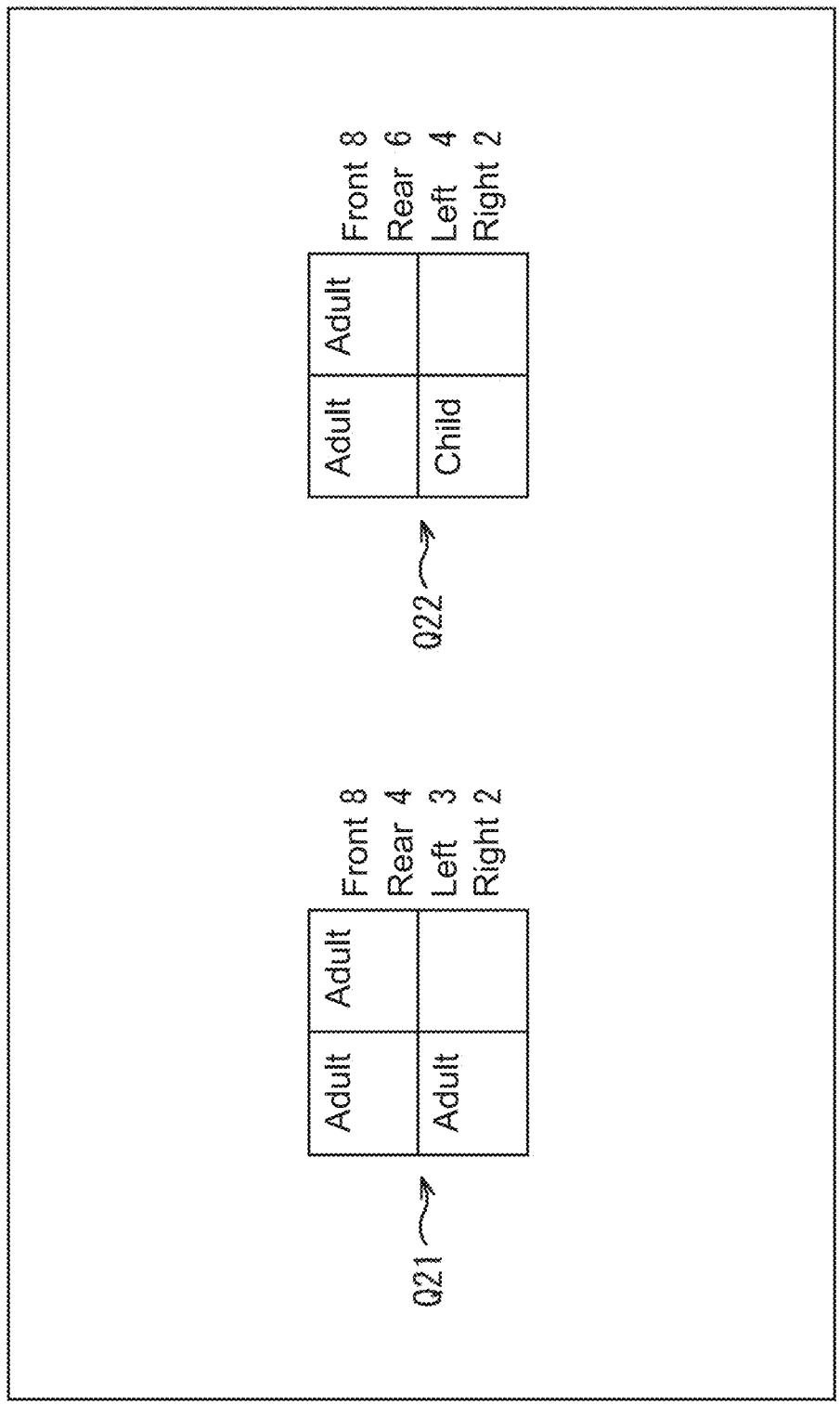
FIG. 12 is a diagram describing the method of determining the reception area.

In this regard, for example, the area determination unit 152 may determine the reception area as shown in FIG. 11 to FIG. 13, on the basis of the host vehicle occupant information, i.e., the number of occupants in the host vehicle 11, the boarding position, and the attribute of the occupant.

Note that in FIG. 11 to FIG. 13, each square represents a seat of the vehicle 11, and the seat drawn on the upper side of the figure is the seat on the front side of the vehicle 11, i.e., the seat on the windshield side including the driver's seat. In the following, in FIG. 11 to FIG. 13, the seat on the upper left side of the figure is also referred to as the front left seat, the seat on the upper right side of the figure is also referred to as the front right seat, the seat on the lower left side of the figure is also referred to as the rear left seat, and the seat on the lower right side of the figure is also referred to as the rear right seat.

In the examples shown in FIG. 11 to FIG. 13, the area determination unit 152 basically determines the size of the reception area in accordance with the following rules (1) to (4).

(1) Regarding the longitudinal direction of the reception area, the size of the reception area in this direction is widened as the number of occupants on the seat in the direction increases.

(2) The larger the total number of occupants, the wider the size of the reception area in the longitudinal direction.

(3) Regarding the lateral direction of the reception area, the size of the reception area in this direction is widened as the number of occupants on the seat in the direction increases.

(4) On the basis of the attribute of the occupant, the size of the reception area on the side of the position of the occupant is determined.

Specifically, for example, assumption is made that adults are sitting in the front left seat and the front right seat of the vehicle 11 as occupants, as shown by an arrow Q11 in FIG. 11.

In such a case, the area determination unit 152 sets the size of the reception area in the front direction to four meters, and sets the size of the reception area in the rear direction, right direction, and left direction to two meters.

Meanwhile, assumption is made that, for example, a child is sitting in the front left seat and an adult is sitting in the front right seat, as shown by an arrow Q12.

In such a case, the area determination unit 152 sets the size of the reception area in the front direction to five meters, the size of the reception area in the left direction to four metes, and the sizes of the reception area in the rear direction and the right direction to two meters. In the example shown by the arrow Q12, the size of the reception area on the left side in which a child is sitting is set to be wider than that in the example shown by the arrow Q11. Similarly, the size of the reception area in the front direction in which the child is sitting is set to be wider.

By making the size of the reception area on the side of weak people such as a child and an elderly person wider in this way, more peripheral vehicle information can be acquired on the weak people side, which makes it possible to improve the possibility of avoiding a collision on the side the weak people are sitting.

Further, assumption is made that, for example, a child is sitting in the rear left seat and an adult is sitting in the front right seat, as shown by an arrow Q13.

In such a case, the area determination unit 152 sets the sizes of the reception area in the front direction and the rear direction to four meters, the size of the reception area in the left direction to four meters, and the size of the reception area in the right direction to two meters. In the example shown by the arrow Q13, the sizes of the reception area in the left side and the rear side the child is sitting are wider than those in the example shown by the arrow Q11.

Further, assumption is made that, for example, adults are sitting in the front left seat, the front right seat, and the rear left seat of the vehicle 11, as shown by an arrow Q21 in FIG. 12.

In such a case, the area determination unit 152 sets the size of the reception area in the front direction to eight meters, the size of the reception area in the rear direction to four meters, the size of the reception area in the left direction to three meters, and the size of the reception area in the right direction to two meters.

In this example, the sizes of the reception area in the front direction and the rear direction are set to be wider by the amount corresponding to the total amount of occupants becoming three than those in the example shown by the arrow Q11 in FIG. 11. Further, since two occupants are sitting on the left seat of the vehicle 11, the size of the reception area on the left side is set to be wider.

Further, assumption is made that adults are sitting in the front left seat and the front right seat of the vehicle 11 and a child is sitting in the rear left seat, as shown by an arrow Q22.

In such a case, the area determination unit 152 sets the size of the reception area in the front direction to eight meters, the size of the reception area in the rear direction to six meters, the size of the reception area in the left direction to four meters, and the size of the reception area in the right direction to two meters.

The example shown by the arrow Q22 is an example in which the occupant of the rear left seat in the example shown by the arrow Q21 is changed from an adult to a child. Therefore, in this example, the sizes of the reception area in the rear side and the left side the child is sitting are set to be wider than those in the example shown by the arrow Q21.

Further, assumption is made that, for example, adults are sitting in the front left seat, the front right seat, the rear left seat, and the rear right seat of the vehicle 11, as shown by an arrow Q31 in FIG. 13.

In such a case, the area determination unit 152 sets the size of the reception area in the front direction to 10 meters, the size of the reception area in the rear direction to seven meters, and the sizes of the reception area in the left direction and the right direction to three meters.

In this example, the sizes of the reception area in the front direction and the rear direction are set to be wider by the amount corresponding to the total amount of occupants becoming four than those in the example shown by the arrow Q11 in FIG. 11. Further, since more occupants are sitting on the right seat and the left seat of the vehicle 11, the sizes of the reception area on the right side and the left side are set to be wider.

Further, assumption is made that adults are sitting in the front left seat and the front right seat of the vehicle 11 and children are sitting in the rear left seat and the rear right seat, as shown by an arrow Q32.

In such a case, the area determination unit 152 sets the size of the reception area in the front direction to 10 meters, the size of the reception area in the rear direction to eight meters, and the sizes of the reception area in the left direction and the right direction to four meters.

The example shown by the arrow Q32 is an example in which the occupants of the rear left seat and the rear right seat in the example shown by the arrow Q31 is changed from adults to children. Therefore, in this example, the sizes of the reception area in the rear side, the left side, and the right side the children are sitting are set to be wider than those in the example shown by the arrow Q31.

Further, assumption is made that adults are sitting in the front left seat, the front right seat, and the rear left seat of the vehicle 11 and a child is sitting in the rear right seat, as shown by an arrow Q33.

In such a case, the area determination unit 152 sets the size of the reception area in the front direction to 10 meters, the size of the reception area in the rear direction to eight meters, the size of the reception area in the left direction to three meters, and the size of the reception area in the right direction to four meters.

The example shown by the arrow Q33 is an example in which the occupant of the rear right seat in the example shown by the arrow Q31 is changed from an adult to a child. Therefore, in this example, the sizes of the reception area in the rear side and the right side the child is sitting are set to be wider than those in the example shown by the arrow Q31.

As described above, by determining the reception area on the basis of the number of occupants in the host vehicle 11, the attribute of the occupant, and the boarding position, it is possible to define a more appropriate reception area. Note that in determining the reception area, it only needs to use at least the number of occupants, and only one or both of the attribute of the occupant and the boarding position may be used.

Second Embodiment

<Description of Driving Control Processing>

Further, the case where the vehicle 11 determines the reception area on the basis of the number of occupants, or the like of the host vehicle and receives the peripheral vehicle information from the peripheral vehicle in the determined reception area has been described above. However, pieces of peripheral vehicle information may be received from peripheral vehicles in a predetermined area, and peripheral vehicle information of a peripheral vehicle in the area having the size corresponding to the number of occupants may be selectively extracted from the pieces of peripheral vehicle information and used for driving assistant.

Figure 14:
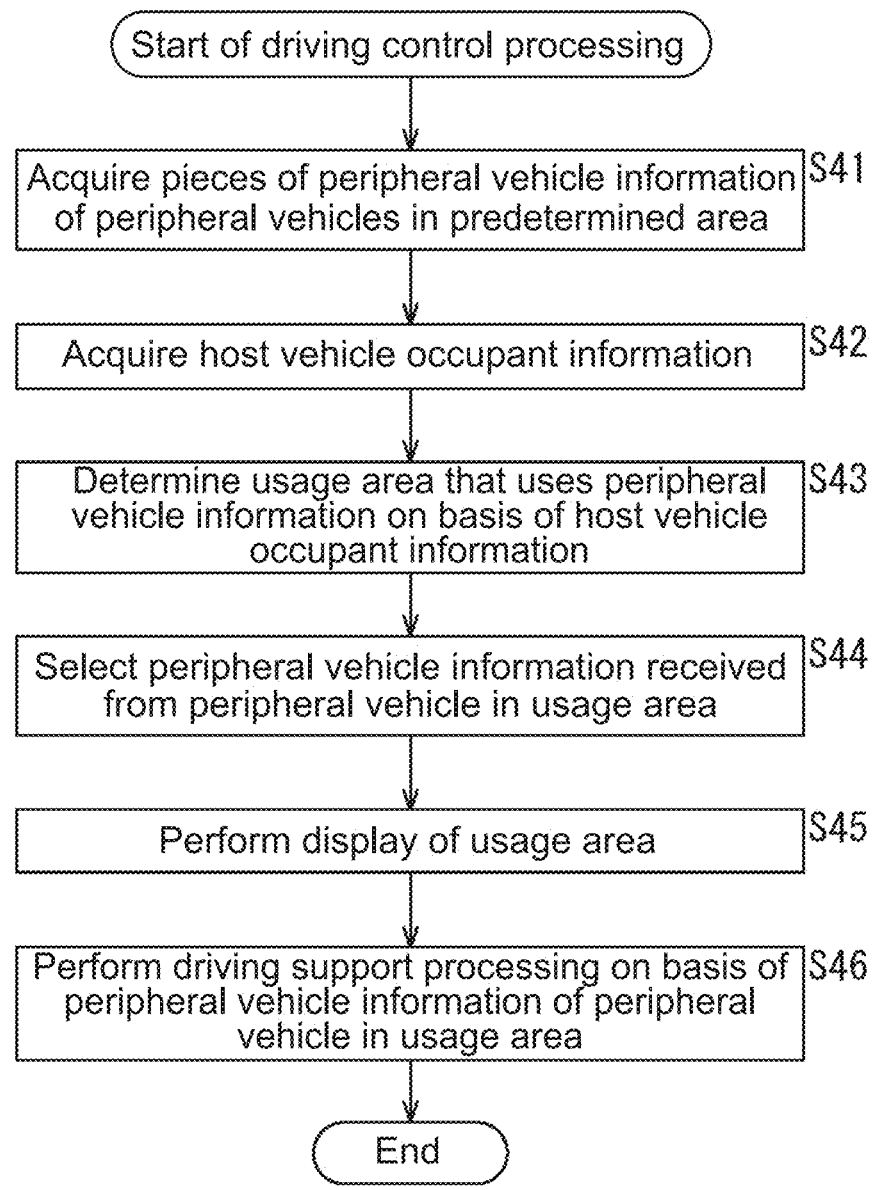
FIG. 14 is a flowchart describing the driving control processing.

Hereinafter, driving control processing performed by the vehicle 11 in such a case will be described with reference to the flowchart of FIG. 14.

In Step S41, the information acquisition unit 151 acquires pieces of peripheral vehicle information of peripheral vehicles in a predetermined area.

That is, the information acquisition unit 151 controls the communication unit 25 to perform inter-vehicle communication with peripheral vehicles in the predetermined area and receive pieces of peripheral vehicle information from the peripheral vehicles. Then, the information acquisition unit 151 acquires the received peripheral vehicle information from the communication unit 25.

Here, the predetermined area (hereinafter, referred to also as the fixed reception area) is, for example, an area having the maximum size in which the vehicle 11 is capable of performing inter-vehicle communication. In such a case, all pieces of peripheral vehicle information that the vehicle 11 is capable of acquiring are acquired.

When the peripheral vehicle information is acquired in this way, then, the host vehicle occupant information is acquired in Step S42. Since the processing of Step S42 is similar to the processing of Step S11 in FIG. 7, description thereof will be omitted.

In Step S43, the area determination unit 152 determines, on the basis of the host vehicle occupant information acquired by the processing of Step S42, a usage area that uses the peripheral vehicle information.

Here, the usage area is a target area from which the peripheral vehicle information used for driving assistant processing is to be acquired, which corresponds to the above-mentioned reception area. In other words, the peripheral vehicle information received from the peripheral vehicle in the usage area is used for driving assistant processing. However, the usage area is an area within the fixed reception area, i.e., a part of the fixed reception area.

The area determination unit 152 determines the usage area corresponding to the number of occupants so that the usage area is widened as the number of occupants in the host vehicle indicated by the host vehicle occupant information increases, similarly to the case of the above-mentioned reception area. In addition, the usage area may be determined by the same way as that of the method determining the reception area described with reference to FIG. 11 to FIG. 13, for example.

In Step S44, the driving assistant processing unit 153 selects, from the pieces of peripheral vehicle information acquired in Step S41, the peripheral vehicle information received from the peripheral vehicle in the usage area determined by Step S43.

In Step S45, the display control unit 154 controls the display unit 24 to display the usage area for the usage area determined by the processing of Step S43. In this Step S45, processing similar to the processing of S14 in FIG. 7 is performed. That is, for example, display similar to the display shown in FIG. 8, FIG. 9, or FIG. 10 is performed.

In Step S46, the driving assistant processing unit 153 performs driving assistant processing on the basis of the peripheral vehicle information of the peripheral vehicle in the usage area, which is selected by the processing of Step S44, and the driving control processing is finished. In Step S46, the peripheral vehicle information selected by the processing of Step S44 is used for performing processing similar to that in Step S15 in FIG. 7.

As described above, the vehicle 11 receives pieces of peripheral vehicle information of peripheral vehicles in the fixed reception area determined in advance, and then uses, out of the pieces of peripheral vehicle information, only the peripheral vehicle information received from the peripheral vehicle in the usage area determined corresponding to the number of occupants in the host vehicle 11, or the like for performing driving assistant processing. By receiving the peripheral vehicle information of the peripheral vehicle in the fixed reception area wider than the usage area in this way, then, it is possible to select only necessary peripheral vehicle information and perform appropriate driving assistant. Such a method is particularly useful in the case of applying the present technology to, for example, a bus or the like in which the number of occupants, the boarding position, and the like are frequently changed.

Further, in the above, the example in which the reception area or the usage area is determined corresponding to the number of occupants in the host vehicle 11 has been described. However, the reception area or the usage area may be determined considering also the number of occupants, the driving mode, the vehicle type, or the travelling speed of the peripheral vehicle travelling immediately before or after the host vehicle 11, the distance between the host vehicle 11 and the peripheral vehicle travelling immediately before or after the host vehicle 11, or the like.

In such a case, in the second embodiment, for example, by acquiring pieces of peripheral vehicle information as much as possible and then determining the usage area on the basis of a part of the pieces of acquired peripheral vehicle information or the host vehicle occupant information, it is possible to appropriately select necessary peripheral vehicle information.

Third Embodiment

<Description of Driving Control Processing>

Further, in the second embodiment, the case where peripheral vehicle information is received in advance from the fixed reception area as a target has been described. However, the peripheral vehicle information may be received in advance from the reception area as a target, and peripheral vehicle information may be additionally acquired as necessary when the reception area is changed.

Hereinafter, driving control processing performed by the vehicle 11 in such a case will be described with reference to the flowchart of FIG. 15.

In Step S71, the information acquisition unit 151 acquires peripheral vehicle information of a peripheral vehicle in the reception area.

In Step S71, processing similar to the processing of Step S13 in FIG. 7 is performed to acquire the peripheral vehicle information. However, the reception area here is a predetermined area, for example. Further, the reception area used in Step S71 may be a reception area defined immediately before the processing of this Step S71 is performed, i.e., when the peripheral vehicle information is finally acquired, for example.

When the processing of Step S71 is performed to acquire the peripheral vehicle information, the processing of Step S72 is performed to acquire the host vehicle occupant information. However, since the processing of Step S72 is similar to the processing of Step S11 in FIG. 7, description thereof will be omitted.

In Step S73, the area determination unit 152 changes the reception area on the basis of the host vehicle occupant information acquired by the processing of Step S72. That is, in Step S73, the reception area is redetermined.

Specifically, the area determination unit 152 may determine the reception area corresponding to the number of occupants in the host vehicle 11 similarly to the case of Step S12 in FIG. 7, for example. Alternatively, the area determination unit 152 may determine the reception area by the method described with reference to FIG. 11 to FIG. 13.

In Step S74, the area determination unit 152 determines whether or not to widen the reception area.

For example, in the case where the reception area determined (changed) in Step S73 is wider than the reception area used in Step S71, it is determined in Step S74 to widen the reception area. Further, in the case where the reception area determined in Step S73 is an area included in the reception area used in Step S71, it is determined in Step S74 not to widen the reception area.

In the case where it is determined in Step S74 not to widen the reception area, in Step S75, the driving assistant processing unit 153 selects, from the pieces of peripheral vehicle information acquired in Step S71, the peripheral vehicle information received from the peripheral vehicle in the reception area that has been changed in Step S73.

Therefore, for example, in the case where the reception area redetermined in Step S73 is the same as the reception area in Step S71, all pieces of peripheral vehicle information acquired in Step S71 are selected.

Meanwhile, in the case where the reception area redetermined in Step S73 is a part of the reception area in Step S71, i.e., the redetermined reception area is an arena narrower than the original reception area before the redetermination, peripheral vehicle information received from a peripheral vehicle in the redetermined reception area.

When the peripheral vehicle information is selected in this way, then, the processing proceeds to Step S77.

Meanwhile, in the case where it is determined to widen the reception area in Step S74, i.e., the changed reception area is wider than the reception area before the change, in Step S76, the information acquisition unit 151 acquires peripheral vehicle information of a peripheral vehicle in the changed reception area.

In Step S76, processing similar to the processing of Step S71 is performed, the peripheral vehicle information is received from the peripheral vehicle in the reception area determined by the processing of Step S73, and the information acquisition unit 151 acquires the peripheral vehicle information.

Note that in Step S76, although peripheral vehicle information may be newly acquired from all peripheral vehicles in the determined reception area, i.e., in the changed reception area, peripheral vehicle information may be received from only a peripheral vehicle out of the peripheral vehicles in the changed reception area, which is not the transmission source of the peripheral vehicle information in Step S71. That is, in Step S76, only peripheral vehicle information that is not received in Step S71 may be received.

When the peripheral vehicle information is acquired with the changed reception area as a target in this way, then, the processing proceeds to Step S77.

When the processing of Step S75 is performed or the processing of Step S76 is performed, then, the processing of Step S77 and Step S78 is performed, and the driving control processing is finished. Since the processing is similar to that in Step S14 and Step S15 in FIG. 7, description thereof will be omitted. However, in Step S78, only the peripheral vehicle information received from the peripheral vehicle in the reception area determined in Step S73, i.e., the peripheral vehicle information selected in Step S75, or the peripheral vehicle information acquired in Step S76 is used for performing driving assistant processing.

As described above, the vehicle 11 acquires the peripheral vehicle information from the peripheral vehicle in the reception area before changing the reception area on the basis of the host vehicle occupant information, and acquires, in the case where the changed reception area is wider than the reception area before the change, peripheral vehicle information from a peripheral vehicle in the changed reception area. Then, the vehicle 11 uses the peripheral vehicle information of the peripheral vehicle in the changed reception area for performing driving assistant processing. In such a way, the peripheral vehicle information is additionally acquired as necessary, and appropriate driving assistant can be performed.

Figure 15:
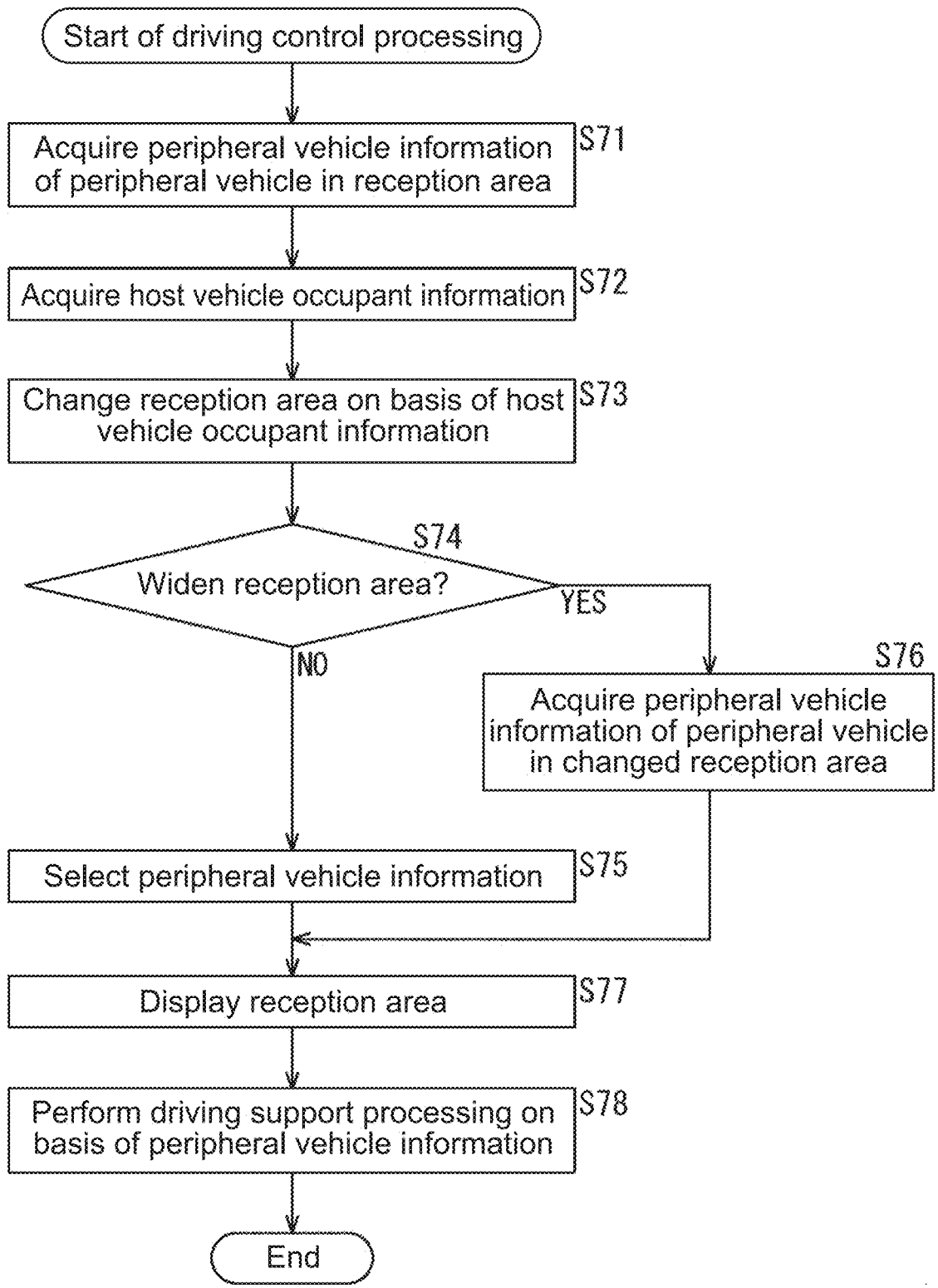
FIG. 15 is a flowchart describing the driving control processing.

Note that also the driving control processing described with reference to FIG. 15 is useful in the case where, for example, the number of occupants, the boarding position, or the like is changed, similarly to the second embodiment. Further, also in the driving control processing described with reference to FIG. 15, not only the host vehicle occupant information but also the peripheral vehicle information received in Step S71 may be used for determining the reception area after change.

Fourth Embodiment

<Description of Driving Control processing>

Incidentally, in the case of using the peripheral vehicle information for performing driving assistant processing, information necessary for driving assistant processing out of pieces information included in the peripheral vehicle information of the peripheral vehicle differs depending on the position of the peripheral vehicle with respect to the host vehicle 11, i.e., the distance from the host vehicle 11 to the peripheral vehicle. In other words, the type of necessary information differs depending on the distance from the host vehicle 11 to the peripheral vehicle.

For example, assumption is made that four occupants are in the host vehicle 11, a forward vehicle A1 is travelling six meters in front of a host vehicle, a forward vehicle A2 is traveling eight meters in front of the host vehicle, and a forward vehicle A3 is travelling 10 meters in front of the host vehicle.

At this time, in the case of using the peripheral vehicle information received from the forward vehicle A1 to the forward vehicle A3 for performing driving assistant, more information of the forward vehicle closer to the host vehicle 11 is necessary.

That is, for example, regarding the forward vehicle A3 travelling 10 meters ahead, it is sufficient to acquire, as the peripheral vehicle information, the travelling information indicating the traveling state, e.g., the forward vehicle A3 is travelling at normal speed or suddenly stops, for performing appropriate driving assistant for avoiding a collision.

Further, regarding the forward vehicle A2 travelling closer to the host vehicle 11 than the forward vehicle A3, for example, it is sufficient to acquire the travelling information and the driver attribute information out of pieces of information included in the peripheral vehicle information for performing appropriate driving assistant for avoiding a collision.

Meanwhile, regarding the forward vehicle A1 travelling immediately before the host vehicle 11, in order to realize appropriate driving assistant for avoiding a collision, more information such as the driving mode information and the number-of-occupants information is necessary in addition to the travelling information and the driver attribute information.

As described above, in order to perform appropriate driving assistant for avoiding a collision, more types of information are necessary for the peripheral vehicle closer to the host vehicle 11. This is because the vehicle closer to the host vehicle 11 greatly affects the occurrence of a collision.

In view of the above, in acquiring the peripheral vehicle information, the type of information to be acquired may be defined for each distance from the host vehicle 11, on the basis of the host vehicle occupant information of the host vehicle 11.

Figure 16:
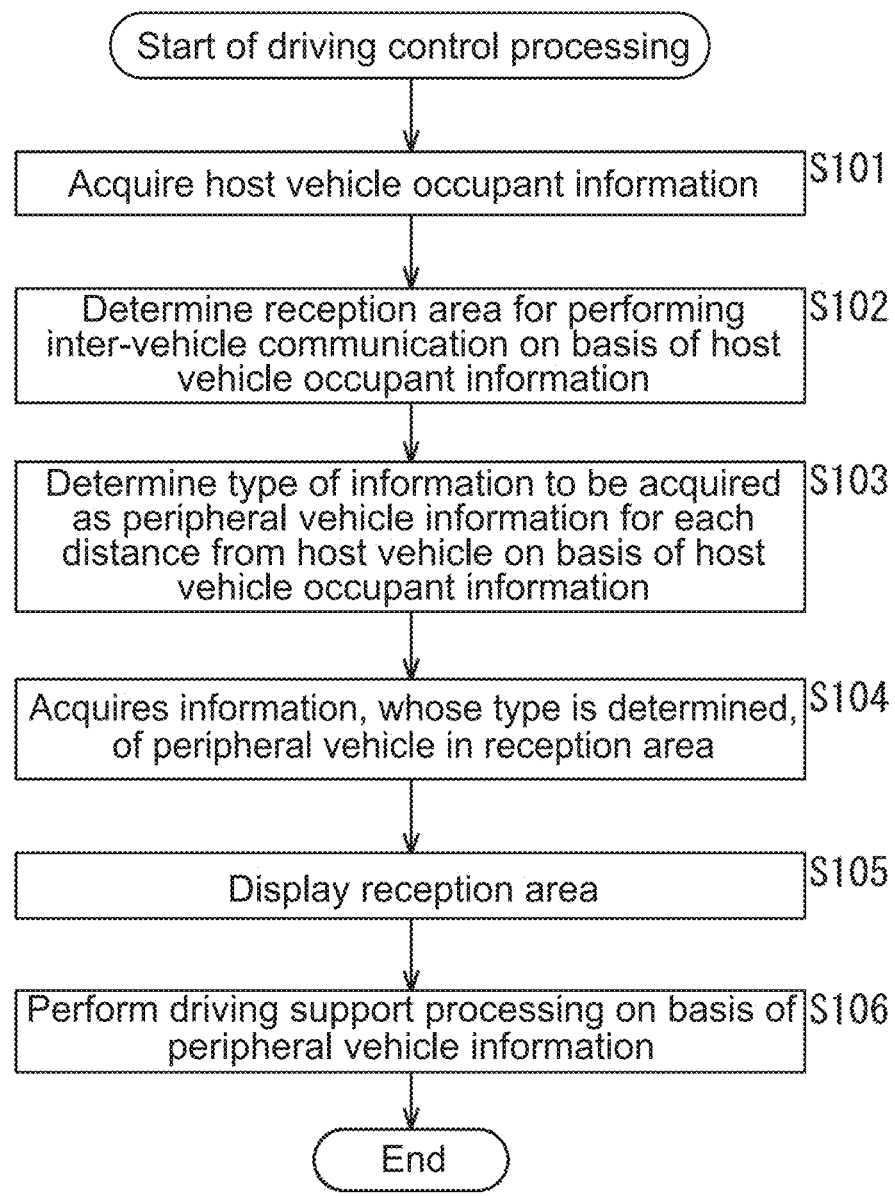
FIG. 16 is a flowchart describing the driving control processing.

In such a case, in the vehicle 11, for example, driving control processing shown in FIG. 16 is performed. That is, hereinafter, driving control processing by the vehicle 11 will be described with reference to the flowchart of FIG. 16. Note that since the processing of Step S101 and Step S102 is similar to the processing of Step S11 and Step S12 in FIG. 7, description thereof will be omitted.

In Step S103, the area determination unit 152 determines the type of information to be acquired as the peripheral vehicle information for each distance from the host vehicle 11, on the basis of the host vehicle occupant information. That is, for each distance from the host vehicle 11 to the peripheral vehicle, information used for driving assistant processing out of pieces of information included in the peripheral vehicle information is determined (selected).

Specifically, for example, in the case where the number of occupants in the host vehicle 11 is four, the area determination unit 152 regards the moving object type information, the driving mode information, the number-of-occupants information, the travelling information, and the driver attribute information as the information of the type to be acquired as the peripheral vehicle information, in the range of six meters from the host vehicle 11. Further, the area determination unit 152 regards the travelling information and the driver attribute information as the information of the type to be acquired as the peripheral vehicle information, and the travelling information as the information of the type to be acquired as the peripheral vehicle information, in the range from six meters to eight meters from the host vehicle 11 and in the range from eight meters to 10 meters from the host vehicle 11, respectively.

Note that although an example in which the type of information to be acquired is determined for each distance from the host vehicle 11 will be described here, the type of information to be acquired as the peripheral vehicle information may be determined for each distance from the host vehicle 11 for each lane, on the basis of, for example, the host vehicle occupant information. Further, the type of information to be acquired as the peripheral vehicle information may be determined for each lane the peripheral vehicle travels, for example.

For example, regarding the same lane as the lane in which the host vehicle 11 travels, since a peripheral vehicle travelling in the lane greatly affects the occurrence of a collision of the host vehicle 11, also peripheral vehicle information of a peripheral vehicle positioned relatively apart from the host vehicle 11 is acquired. Meanwhile, regarding the lane adjacent to the lane in which the host vehicle 11, since a peripheral vehicle that is not in the vicinity of the host vehicle 11 does not greatly affect the occurrence of a collision of the host vehicle 11, peripheral vehicle information is acquired only from a peripheral vehicle close to the host vehicle 11. At this time, regarding the peripheral vehicle travelling in the adjacent lane, since the amount of necessary information is not so much, for example, it only needs to acquire the travelling information.

Further, although the example in which the reception area is determined in Step S102 and the type of information to be acquired is determined for each distance from the host vehicle 11 in Step S103 has been described here, the reception area may be an area having a fixed size determined in advance.

Further, by determining the type of information to be acquired for each distance from the host vehicle 11 in Step S103, the reception area is substantially determined by the determination result, so that particularly, the processing of Step S102 may be omitted. In such a case, the reception area is determined substantially in Step S103.

When the reception area and the type of information to be acquired for each distance in the reception area are determined in this way, the information acquisition unit 151 acquires peripheral vehicle information on the basis of determination result by the area determination unit 152.

That is, in Step S104, the information acquisition unit 151 acquires, as the peripheral vehicle information, the information, whose type is determined in Step S103, of the peripheral vehicle in the reception area determined by the processing of Step S102.

Specifically, the information acquisition unit 151 controls the communication unit 25 to perform inter-vehicle communication with the peripheral vehicle in the reception area and receive the peripheral vehicle information including the information of the type determined by Step S103 from the peripheral vehicle. Then, the information acquisition unit 151 acquires the received peripheral vehicle information from the communication unit 25.

When the peripheral vehicle information is acquired, then, the processing of Step S105 and Step S106 is performed, and the driving control processing is finished. Since the processing is similar that in Step S14 and Step S15 in FIG. 7, description thereof will be omitted.

As described above, the vehicle 11 determines the type of information to be acquired for each distance from the host vehicle 11, acquires peripheral vehicle information in accordance with the determination, and performs driving assistant processing. Accordingly, it is possible to acquire only necessary information and perform appropriate driving assistant.

Fifth Embodiment

<Description of Driving Control Processing>

Further, the vehicle 11 may perform processing combining the second embodiment and the fourth embodiment described above.

Figure 17:
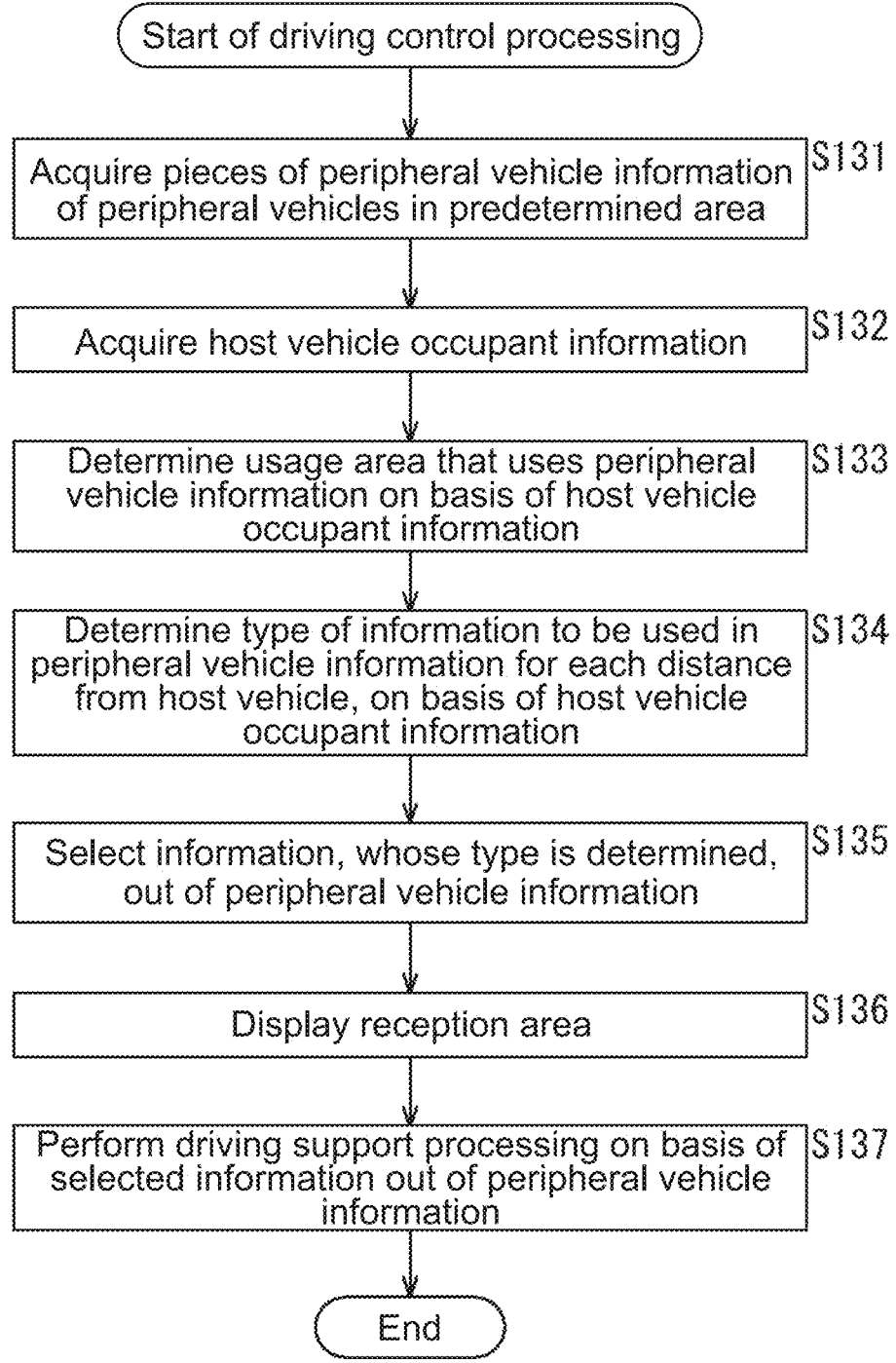
FIG. 17 is a flowchart describing the driving control processing.

Hereinafter, the driving control processing performed by the vehicle 11 in such a case will be described with reference to the flowchart of FIG. 17. Note that since the processing of Step S131 to Step S133 is similar to that in Step S41 to Step S43 in FIG. 14, description thereof will be omitted.

In Step S134, the area determination unit 152 determines the type of information to be used in the peripheral vehicle information for each distance from the host vehicle 11, on the basis of the host vehicle occupant information.

In Step S134, the type of information to be used for driving assistant processing for each distance from the host vehicle 11 is determined similarly to Step S103 in FIG. 16. Note that also in Step S134, the type of information to be used may be determined considering not only the distance from the host vehicle 11 but also the lane of the peripheral vehicle. Further, also in Step S134, since the usage area is substantially determined in the case where the type of information to be used for each distance is determined, similarly to Step S103 in FIG. 16, the processing of Step S133 does not necessarily need to be performed.

In Step S135, the driving assistant processing unit 153 selects information, whose type is determined in Step S134, of the peripheral vehicle information received from the peripheral vehicle in the usage area determined in Step S133 out of the peripheral vehicle information acquired in Step S131.

When the processing of Step S135 is performed, then, the processing of Step S136 and Step S137 is performed, and the driving control processing is finished. Since the processing is similar to that in Step S45 and Step S46 in FIG. 14, description thereof will be omitted. However, in Step S137, the information selected in the processing of Step S135 is used for performing the driving assistant processing.

In this way, the vehicle 11 receives the peripheral vehicle information from the peripheral vehicle in the fixed reception area determined in advance, and selects necessary information out of the peripheral vehicle information depending on the number of occupants in the host vehicle 11 or the distance from the host vehicle 11, thereby to perform the driving assistant processing. Accordingly, it is possible to use only necessary information to perform appropriate driving assistant.

Note that although the example in which the second embodiment and the fourth embodiment is combined has been described here, the third embodiment and the fourth embodiment may be combined. In such a case, additional information of the type that becomes necessary is further acquired for each distance from the host vehicle 11 or each lane.

<Configuration Example of Computer>

Incidentally, the series of processes described above can be performed by hardware or software. In the case where the series of processes are performed by the software, programs that constitute the software are installed in a computer. Examples of the computer include a computer incorporated in dedicated hardware, a general-purpose personal computer capable of executing various functions by installing various programs, and the like.

Figure 18:
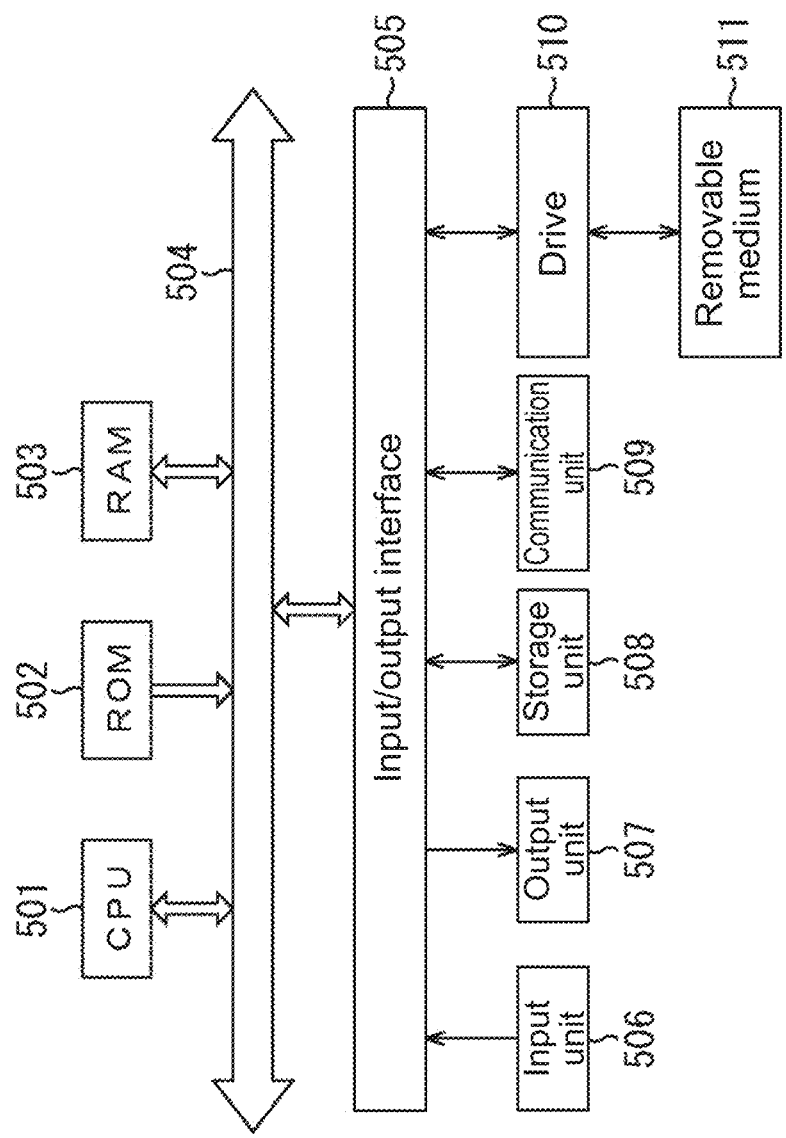
FIG. 18 is a diagram showing a configuration example of a computer.

FIG. 18 is a block diagram showing a configuration example of the hardware of a computer that executes the series of processes described above by programs.

In a computer, a CPU (Central Processing Unit) 501, a ROM (Read Only Memory) 502, and a RAM (Random Access Memory) 503 are connected to each other via a bus 504.

To the bus 504, an input/output interface 505 is further connected. To the input/output interface 505, an input unit 506, an output unit 507, a storage unit 508, a communication unit 509, and a drive 510 are connected.

The input unit 506 includes an input switch, a button, a microphone, an image sensor, or the like. The output unit 507 includes a display, a speaker, or the like. The storage unit 508 includes a hard disk, a non-volatile memory, or the like. The communication unit 509 includes a network interface or the like. The drive 510 drives a removable medium 511 such as a magnetic disk, an optical disk, a magneto-optical disk, and a semiconductor memory.

In the computer 500 having the configuration as described above, for example, the CPU 501 loads a program stored in the storage unit 508 to the RAM 503 via the input/output interface 505 and the bus 504 and executes the program, thereby executing the series of processes described above.

The program executed by the computer 500 (CPU 501) can be provided by being recorded in the removable medium 511 as a package medium or the like, for example. Further, the program can be provided via a wired or wireless transmission medium, such as a local area network, the Internet, and a digital satellite broadcast.

In the computer, the program can be installed in the storage unit 508 via the input/output interface 505 by loading the removable medium 511 to the drive 510. Further, the program can be received by the communication unit 509 via a wired or wireless transmission medium and installed in the storage unit 508. In addition, the program can be installed in advance in the ROM 502 or the storage unit 508.

It should be noted that the program executed by the computer may be a program, the processes of which are performed in a chronological order along the description order in the specification, or may be a program, the processes of which are performed in parallel or at necessary timings when being called, for example.

Further, the embodiments of present technology are not limited to the above-mentioned embodiments and can be variously modified without departing from the essence of the present technology.

For example, the present technology can have the configuration of cloud computing in which one function is shared by a plurality of apparatuses via a network and processed in cooperation with each other.

Further, the steps described in the flowchart described above can be executed by one apparatus or by a plurality of apparatuses in a sharing manner.

Further, in the case where one step includes a plurality of processes, the plurality of processes in the one step can be performed by one apparatus or shared by a plurality of apparatus.

Further, the present technology can also take the following configurations.

(1)

A driving assistant apparatus, including a control unit that performs, on a basis of peripheral vehicle information regarding a peripheral vehicle present in an area corresponding to the number of occupants in a host vehicle, driving assistant processing of the host vehicle.

(2) The driving assistant apparatus according to (1), in which the area is determined to be wider as the number of occupants in the host vehicle increases.

(3) The driving assistant apparatus according to (1) or (2), in which the driving assistant processing is processing for avoiding a collision between the host vehicle and the peripheral vehicle.

(4) The driving assistant apparatus according to any one of (1) to (3), in which the peripheral vehicle information is information including at least one of information indicating a travelling state of the peripheral vehicle, information indicating the number of occupants of the peripheral vehicle, information indicating a type of the peripheral vehicle, information indicating a driving mode of the peripheral vehicle, or information indicating an attribute of a driver of the peripheral vehicle.

(5) The driving assistant apparatus according to any one of (1) to (4), in which the control unit determines the area on a basis of the number of occupants in the host vehicle.

(6) The driving assistant apparatus according to (5), in which the control unit determines the area on a basis of the number of occupants in the host vehicle, and a boarding position of an occupant in the host vehicle or an attribute of the occupant.

(7) The driving assistant apparatus according to (5) or (6), in which the control unit performs the driving assistant processing on a basis of the peripheral vehicle information of the peripheral vehicle in the area determined on a basis of the number of occupants in the host vehicle, out of pieces of peripheral vehicle information received from peripheral vehicles in a predetermined area wider than the area.

(8) The driving assistant apparatus according to (5) or (6), in which the control unit acquires pieces of peripheral vehicle information of peripheral vehicles in a predetermined area, and then further acquires, in a case where the area determined on a basis of the number of occupants of the host vehicle is wider than the predetermined area, the peripheral vehicle information of the peripheral vehicle in the determined area.

(9) The driving assistant apparatus according to any one of (1) to (8), in which the control unit selects, on a basis of the number of occupants in the host vehicle, a type of information to be used for the driving assistant processing out of pieces of information included in the peripheral vehicle information of the peripheral vehicle, for each distance to the peripheral vehicle or each lane in which the peripheral vehicle travels.

(10) The driving assistant apparatus according to any one of (1) to (9), in which the control unit further controls presentation of information regarding the area.

(11) A driving assistant method, including the step of performing, on a basis of peripheral vehicle information regarding a peripheral vehicle present in an area corresponding to the number of occupants in a host vehicle, driving assistant processing of the host vehicle.

(12) A program that causes a computer to execute processing including the step of performing, on a basis of peripheral vehicle information regarding a peripheral vehicle present in an area corresponding to the number of occupants in a host vehicle, driving assistant processing of the host vehicle.

(13) A moving object, including a control unit that performs, on a basis of peripheral vehicle information regarding a peripheral vehicle present in an area corresponding to the number of occupants in a host vehicle, driving assistant processing of the host vehicle.

REFERENCE SIGNS LIST 11 vehicle
25 communication unit
34 braking device
35 engine
37 driving motor
51 driving control ECU
141 host vehicle occupant information acquisition unit
151 information acquisition unit
152 area determination unit
153 driving assistant processing unit
154 display control unit

The invention claimed is:

1. A driving assistant apparatus, comprising:
processing circuitry configured to:
acquire host vehicle occupant information including a number of occupants of a host vehicle;
determine a reception area based on the number of occupants of the host vehicle;
acquire peripheral vehicle information of a peripheral vehicle in the reception area; and
output driving assistance information to control operation of the host vehicle based on the acquired peripheral vehicle information of the peripheral vehicle in the reception area.

2. The driving assistant apparatus according to claim 1, wherein
the reception area is determined to be wider as the number of occupants in the host vehicle increases.

3. The driving assistant apparatus according to claim 1, wherein
the processing circuitry is configured to avoid a collision between the host vehicle and the peripheral vehicle.

4. The driving assistant apparatus according to claim 1, wherein
the peripheral vehicle information is information including at least one of information indicating a travelling state of the peripheral vehicle, information indicating the number of occupants of the peripheral vehicle, information indicating a type of the peripheral vehicle, information indicating a driving mode of the peripheral vehicle, or information indicating an attribute of a driver of the peripheral vehicle.

5. The driving assistant apparatus according to claim 1, wherein
the processing circuitry is configured to determine the reception area on a basis of the number of occupants in the host vehicle, and a boarding position of an occupant in the host vehicle or an attribute of the occupant.

6. The driving assistant apparatus according to claim 1, wherein
the processing circuitry is configured to output the driving assistance information on a basis of the peripheral vehicle information of the peripheral vehicle in the reception area determined on a basis of the number of occupants in the host vehicle, out of pieces of peripheral vehicle information received from peripheral vehicles in a predetermined area wider than the reception area.

7. The driving assistant apparatus according to claim 1, wherein
the processing circuitry is configured to acquire pieces of peripheral vehicle information of peripheral vehicles in a predetermined area, and then further acquire, in a case where the reception area determined on a basis of the number of occupants of the host vehicle is wider than the predetermined area, the peripheral vehicle information of the peripheral vehicle in the reception area.

8. The driving assistant apparatus according to claim 1, wherein
the processing circuitry is configured to select, on a basis of the number of occupants in the host vehicle, a type of information to be used out of pieces of information included in the peripheral vehicle information of the peripheral vehicle, for each distance to the peripheral vehicle or each lane in which the peripheral vehicle travels.

9. The driving assistant apparatus according to claim 1, wherein
the processing circuitry is further configured to control presentation of information regarding the reception area.

10. A driving assistant method executed by processing circuitry, comprising:
acquiring host vehicle occupant information including a number of occupants of a host vehicle;
determining a reception area based on the number of occupants of the host vehicle;
acquiring peripheral vehicle information of a peripheral vehicle in the reception area; and
outputting driving assistance information to control operation of the host vehicle based on the acquired peripheral vehicle information of the peripheral vehicle in the reception area.

11. A non-volatile computer readable medium containing instructions that, when executed by processing circuitry, perform a driving assistant method comprising:
acquiring host vehicle occupant information including a number of occupants of a host vehicle;
determining a reception area based on the number of occupants of the host vehicle;
acquiring peripheral vehicle information of a peripheral vehicle in the reception area; and
outputting driving assistance information to control operation of the host vehicle based on the acquired peripheral vehicle information of the peripheral vehicle in the reception area.

12. A moving object, comprising:
processing circuitry configured to:
acquire host vehicle occupant information including a number of occupants of a host vehicle;
determine a reception area based on the number of occupants of the host vehicle;
acquire peripheral vehicle information of a peripheral vehicle in the reception area; and
output driving assistance information to control operation of the host vehicle based on the acquired peripheral vehicle information of the peripheral vehicle in the reception area.

* * * * *